US012638372B2

(12) United States Patent
Nakamura et al.

(10) Patent No.: US 12,638,372 B2
(45) Date of Patent: May 26, 2026

(54) LIGHT SCATTERING MEASUREMENT DEVICE AND LIGHT SCATTERING MEASUREMENT METHOD

(71) Applicant: FUJIFILM Corporation, Tokyo (JP)

(72) Inventors: Sohichiro Nakamura, Kanagawa (JP); Kenichi Hamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 87 days.

(21) Appl. No.: 18/509,253

(22) Filed: Nov. 14, 2023

(65) Prior Publication Data

US 2024/0077399 A1 Mar. 7, 2024

Related U.S. Application Data

(63) Continuation of application No. PCT/JP2022/021394, filed on May 25, 2022.

(30) Foreign Application Priority Data

Jun. 21, 2021 (JP) ................................. 2021-102680

(51) Int. Cl.
*G01N 15/0205* (2024.01)
(52) U.S. Cl.
CPC ................................. *G01N 15/0205* (2013.01)
(58) Field of Classification Search
CPC .................................................. G01N 15/0205
See application file for complete search history.

(56) References Cited

U.S. PATENT DOCUMENTS 5,475,235 A * 12/1995 Phillips ................... H01S 5/042
356/343
2014/0152986 A1 * 6/2014 Trainer .............. G01N 15/0211
356/336

(Continued)

FOREIGN PATENT DOCUMENTS

JP 2005134205 5/2005
JP 2017528689 9/2017

(Continued)

OTHER PUBLICATIONS

"International Search Report (Form PCT/ISA/210) of PCT/JP2022/021394", mailed on Jul. 19, 2022, with English translation thereof, pp. 1-5.

(Continued)

*Primary Examiner* — Kara E. Geisel
*Assistant Examiner* — Jarreas Underwood
(74) *Attorney, Agent, or Firm* — JCIPRNET

(57) ABSTRACT

Provided are a light scattering measurement device and a light scattering measurement method that specify a material of a particle included in a dispersion liquid including at least one type of particles. The light scattering measurement device includes a light source unit that irradiates the dispersion liquid including at least one type of particles with measurement light, a parameter setting unit that sets at least one of a scattering angle or a measurement wavelength as a measurement parameter, a scattered light measurement unit that obtains a plurality of pieces of scattering intensity data by measuring a scattering intensity of scattered light emitted from the dispersion liquid by the measurement light a plurality of times while changing a value of the measurement parameter a plurality of times, and a calculation unit that calculates scattering intensity time variation characteristic data and scattering intensity parameter-dependent data from the scattering intensity data, and specifies a material of each type of particle of the particles of the dispersion liquid specified by fitting the scattering intensity time variation characteristic data and the scattering intensity parameter-dependent data using a theoretical formula or a simulation based on a theory of electromagnetic wave behavior that defines a relationship of a refractive index, a particle diameter, and the scattering intensity.

20 Claims, 11 Drawing Sheets

(56) References Cited

U.S. PATENT DOCUMENTS

| | | | | |
|---|---|---|---|---|
| 2016/0266028 A1* | 9/2016 | Wyatt | ................ | G01N 15/1434 |
| 2017/0184485 A1 | 6/2017 | Wang et al. | | |
| 2018/0313738 A1 | 11/2018 | Kawano | | |
| 2022/0205899 A1 | 6/2022 | Yamane et al. | | |

FOREIGN PATENT DOCUMENTS

| | | |
|---|---|---|
| JP | 2018031660 | 3/2018 |
| JP | 2020193877 | 12/2020 |
| WO | 2011045961 | 4/2011 |
| WO | 2017069260 | 4/2017 |

OTHER PUBLICATIONS

"Written Opinion of the International Searching Authority (Form PCT/ISA/237) of PCT/JP2022/021394", mailed on Jul. 19, 2022, with English translation thereof, pp. 1-8.

"Office Action of Korea Counterpart Application", issued on Jan. 15, 2025, with English translation thereof, p. 1-p. 13.

T. T. Charalampopoulos, "Morphology and Dynamics of Agglomerated Particulates in Combustion Systems Using Light Scattering Techniques", Progress in Energy and Combustion Science, Jan. 1, 1992, pp. 13-45, vol. 18, No. 1.

"Search Report of Europe Counterpart Application", issued on Sep. 23, 2024, p. 1-p. 8.

"Office Action of Europe Counterpart Application", issued on Dec. 19, 2025, pp. 1-5.

"Office Action of Korea Counterpart Application", issued on Sep. 23, 2025, with English translation thereof, pp. 1-11.

"Notice of Reasons for Refusal of Japan Counterpart Application", issued on Mar. 17, 2026, with English translation thereof, p. 1-p. 5.

* cited by examiner

LIGHT SCATTERING MEASUREMENT DEVICE AND LIGHT SCATTERING MEASUREMENT METHOD

CROSS-REFERENCE TO RELATED APPLICATIONS

This application is a Continuation of PCT International Application No. PCT/JP2022/021394 filed on May 25, 2022, which claims priority under 35 U.S.C. § 119(a) to Japanese Patent Application No. 2021-102680 filed on Jun. 21, 2021. The above applications are hereby expressly incorporated by reference, in their entirety, into the present application.

BACKGROUND OF THE INVENTION

1. Field of the Invention

The present invention relates to a light scattering measurement device and a light scattering measurement method that specify a material of a particle included in a dispersion liquid including at least one type of particles.

2. Description of the Related Art

There is known a dynamic light scattering measurement method that checks dynamic characteristics of scatterers by applying light to a medium, such as a colloidal solution or a particle dispersion liquid, and detecting a time variation of a scattered light intensity scattered from the scatterers in the medium using an autocorrelation function or a power spectrum. The dynamic light scattering measurement method has been widely used in various kinds of measurement, such as particle diameter measurement and gel structure analysis.

In JP2018-31660A, an input of light intensity distribution data obtained by receiving, with a plurality of light-receiving elements, diffracted scattered light from a sample with a plurality of types of particles having different refractive indexes mixed is received. A storage unit stores a coefficient matrix in which optical models obtained for respective refractive indexes are combined. A particle diameter distribution data generation unit generates particle diameter distribution data for each of a plurality of types of particles having different refractive indexes by performing an arithmetic operation based on the light intensity distribution data and the coefficient matrix.

SUMMARY OF THE INVENTION

JP2018-31660A describes that the particle diameter distribution of the sample with a plurality of types of particles having different refractive indexes mixed is measured; however, it is not possible to specify which materials the included particles are.

At present, it is desirable to specify the included particles and materials of which the included particles are composed.

An object of the present invention is to provide a light scattering measurement device and a light scattering measurement method that specify a material of a particle included in a dispersion liquid including at least one type of particles.

To attain the above-described object, the invention [1] provides a light scattering measurement device of a dispersion liquid including at least one type of particles, the light scattering measurement device comprising a light source unit that irradiates the dispersion liquid with measurement light, a parameter setting unit that sets at least one of a scattering angle or a measurement wavelength as a measurement parameter, a scattered light measurement unit that obtains a plurality of pieces of scattering intensity data by measuring a scattering intensity of scattered light emitted from the dispersion liquid by the measurement light a plurality of times while changing a value of the measurement parameter set by the parameter setting unit a plurality of times, and a calculation unit that calculates scattering intensity time variation characteristic data and scattering intensity parameter-dependent data from the plurality of pieces of scattering intensity data obtained by the scattered light measurement unit, fits the calculated scattering intensity time variation characteristic data and the calculated scattering intensity parameter-dependent data using a theoretical formula or a simulation based on a theory of electromagnetic wave behavior that defines a relationship of a refractive index, a particle diameter, and the scattering intensity, specifies a combination of the number of types of particles in the dispersion liquid, a refractive index of a particle, and a particle size distribution of the particle by the fitting, and specifies a material of each type of particle of the specified particles in the dispersion liquid.

The invention [2] is the light scattering measurement device according to the invention [1], in which the measurement parameter is the scattering angle, and the scattered light measurement unit obtains the plurality of pieces of scattering intensity data by measuring the scattering intensity of the scattered light of the dispersion liquid a plurality of times while changing a value of the scattering angle by two angles or more.

The invention [3] is the light scattering measurement device according to the invention [1], in which the measurement parameter is the measurement wavelength, and the scattered light measurement unit obtains the plurality of pieces of scattering intensity data by measuring the scattering intensity of the scattered light of the dispersion liquid a plurality of times using the measurement wavelength of two wavelengths or more.

The invention [4] is the light scattering measurement device according to any one of the inventions [1] to [3], in which the scattered light measurement unit measures a light intensity of a polarized component of the scattered light of the dispersion liquid obtained by irradiating the dispersion liquid with the measurement light having specific polarization, as the scattering intensity.

The invention [5] is the light scattering measurement device according to any one of the inventions [1] to [4], in which the scattered light measurement unit measures at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times.

The invention [6] is the light scattering measurement device according to any one of the inventions [1] to [5], in which a profile of the scattering intensity obtained while changing the value of the measurement parameter is different for each of a plurality of types of particles of the particles.

The invention [7] is the light scattering measurement device according to any one of the inventions [1] to [6], in which the calculated scattering intensity time variation characteristic data of the measurement parameter is calculated based on a Stokes-Einstein's theoretical formula, and the scattering intensity parameter-dependent data of the measurement parameter is calculated based on at least one of a Mie scattering theoretical formula, a discrete dipole approximation method, or a finite-difference time-domain method.

The invention [8] provides a light scattering measurement method of a dispersion liquid including at least one type of particles, in which at least one of a scattering angle or a measurement wavelength is set as a measurement parameter, and the light scattering measurement method comprises a measurement step of measuring a scattering intensity of scattered light emitted from the dispersion liquid by the measurement light a plurality of times while changing a value of the set measurement parameter a plurality of times, a calculation step of calculating scattering intensity time variation characteristic data and scattering intensity parameter-dependent data from a plurality of pieces of scattering intensity data obtained by the measurement step, a step of fitting the scattering intensity time variation characteristic data and the scattering intensity parameter-dependent data, which are obtained by the calculation step, using a theoretical formula or a simulation based on a theory of electromagnetic wave behavior that defines a relationship of a refractive index, a particle diameter, and the scattering intensity, a step of specifying a combination of the number of types of particles in the dispersion liquid, a refractive index of a particle, and a particle size distribution of the particle by the fitting, and a step of specifying a material of each type of particle of the specified particles in the dispersion liquid.

The invention [9] is the light scattering measurement method according to the invention [8], in which the measurement parameter is the scattering angle, and in the measurement step, the scattering intensity of the scattered light of the dispersion liquid is measured a plurality of times while changing a value of the scattering angle by two angles or more.

The invention [10] is the light scattering measurement method according to the invention [8], in which the measurement parameter is the measurement wavelength, and in the measurement step, the scattering intensity of the scattered light of the dispersion liquid is measured a plurality of times using the measurement wavelength of two wavelengths or more.

The invention [11] is the light scattering measurement method according to any one of the inventions [8] to [10], in which, in the measurement step, a light intensity of a polarized component of the scattered light of the dispersion liquid obtained by irradiating the dispersion liquid with the measurement light having specific polarization is measured as the scattering intensity.

The invention [12] is the light scattering measurement method according to any one of the inventions [8] to [11], in which, in the measurement step, at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times is measured.

The invention [13] is the light scattering measurement method according to any one of the inventions [8] to [12], in which a profile of the scattering intensity obtained while changing the value of the measurement parameter is different for each of a plurality of types of particles of the particles.

The invention [14] is the light scattering measurement method according to any one of the inventions [8] to [13], in which the calculated scattering intensity time variation characteristic data of the measurement parameter is calculated based on a Stokes-Einstein's theoretical formula, and the scattering intensity parameter-dependent data of the measurement parameter is calculated based on at least one of a Mie scattering theoretical formula, a discrete dipole approximation method, or a finite-difference time-domain method.

According to the present invention, it is possible to provide a light scattering measurement device and a light scattering measurement method that specify a material of a particle included in a dispersion liquid including at least one type of particles.

DESCRIPTION OF THE PREFERRED EMBODIMENTS

Hereinafter, a light scattering measurement device and a light scattering measurement method of an embodiment of the present invention will be described in detail based on a preferred embodiment shown in the accompanying drawings.

The drawings described below are exemplary for describing the present invention, and the present invention is not limited to the drawings described below.

Hereinafter, the expression "to" indicating a numerical range includes numerical values described on both sides. For example, $\varepsilon$ is a numerical value $\alpha$ to a numerical value $\beta$ means that a range of $\varepsilon$ is a range including the numerical value $\alpha$ and the numerical value $\beta$, and is represented as $\alpha \leq \varepsilon \leq \beta$ by mathematical signs.

Angles, such as "angles represented by specific numerical values" and "vertical", include error ranges generally tolerated in the technique field unless specifically described.

(Light Scattering Measurement Device)

Figure 1:
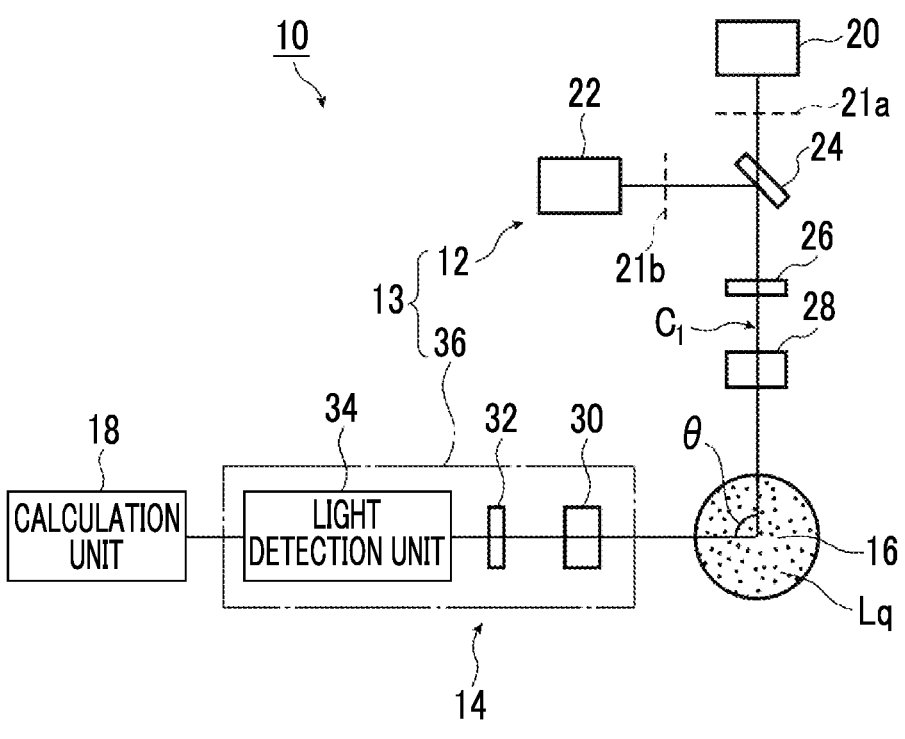
FIG. 1 is a schematic view showing an example of a light scattering measurement device of an embodiment of the present invention.

FIG. 1 is a schematic view showing an example of a light scattering measurement device of an embodiment of the present invention.

A light scattering measurement device 10 shown in FIG. 1 has an incidence setting unit 12 that irradiates a sample cell 16 in which a dispersion liquid Lq including at least one type of particles is stored, with laser light as measurement light, a scattered light measurement unit 14 that measures a scattering intensity of scattered light scattered and emitted from the dispersion liquid Lq by laser light, and a calculation unit 18 that calculates a particle size distribution of each type of particle included in the dispersion liquid. The number of types of particles of the particles included in the dispersion liquid Lq is not particularly limited and may be two types or three types. As the type of particle, one type may be provided.

The incidence setting unit 12 has a first light source unit 20 that emits laser light as measurement light to the dispersion liquid Lq, a second light source unit 22 that emits laser light as measurement light to the dispersion liquid Lq, a half mirror 24, a condenser lens 26 that condenses laser light transmitted through or reflected by the half mirror 24 to the sample cell 16, and a polarizer 28 that transmits only a given polarized component out of laser light. A first shutter 21a is provided between the first light source unit 20 and the half mirror 24. A second shutter 21b is provided between the second light source unit 22 and the half mirror 24. Laser light emitted from the first light source unit 20 is made to be incident on or is shielded to prevent incidence on the half mirror 24 by the first shutter 21a. Laser light emitted from the second light source unit 22 is made to be incident on or is shielded to prevent incidence on the half mirror 24 by the second shutter 21b.

The first shutter 21a and the second shutter 21b are not particularly limited as long as emitted laser light can be made to be incident on the half mirror 24 or can be shielded, and a known on-off shutter that is used for control of emission of laser light can be used.

Instead of providing the first shutter 21a and the second shutter 21b, for example, the emission of the first light source unit 20 and the emission of the second light source unit 22 may be controlled to control the emission of laser light to the half mirror 24.

The half mirror 24 transmits laser light emitted from the first light source unit 20 and reflects laser light emitted from the second light source unit 22, for example, at 90° with respect to an incidence direction to the same optical path as laser light emitted from the first light source unit 20. Laser light transmitted through the half mirror 24 and laser light reflected by the half mirror 24 passes through the same optical axis $C_1$. The condenser lens 26 and the polarizer 28 are disposed on the optical axis $C_1$. The sample cell 16 is disposed on the optical axis $C_1$.

A shutter (not shown) that temporarily shields an optical path of laser light and a neutral density (ND) filter (not shown) that attenuates laser light may be provided on the optical axis $C_1$ of the laser light.

The ND filter is provided to adjust a light amount of laser light, and a known ND filter can be suitably used.

As the polarizer 28, a polarizer according to polarized light with which the sample cell 16 is irradiated, such as circularly polarized light, linearly polarized light, or elliptically polarized light, is suitably used. In a case where it is not necessary to irradiate the sample cell 16 with polarized light, the polarizer 28 is not always required.

The first light source unit 20 irradiates the dispersion liquid Lq with laser light as measurement light to the dispersion liquid Lq, and is, for example, an Ar laser that emits laser light having a wavelength of 488 nm. The wavelength of laser light is not particularly limited.

The second light source unit 22 irradiates the dispersion liquid Lq with laser light as measurement light to the dispersion liquid Lq, and is, for example, a He—Ne laser that emits laser light having a wavelength of 632.8 nm or 633 nm. The wavelength of laser light is not particularly limited.

The first light source unit 20 and the second light source unit 22 are different in wavelength of laser light. In the light scattering measurement device 10, an appropriate wavelength is different depending on a target particle to be measured. For this reason, it is desirable to select a combination of wavelengths such that a refractive index difference of a plurality of particles is considerably different between wavelengths.

The incidence setting unit 12 sets at least one of a scattering angle or a measurement wavelength as a measurement parameter. As the measurement parameter, there are the scattering angle, the measurement wavelength, and a combination of the scattering angle and the measurement wavelength. In the measurement parameter, a value of the scattering angle is two angles or more, and the measurement wavelength is two wavelengths or more.

Here, the two angles are the number of scattering angles. The two angles are, for example, scattering angles of 45° and 90°.

The two wavelengths are the number of measurement wavelengths. The two wavelengths are, for example, a wavelength of 632.8 nm or 633 nm and a wavelength of 488 nm.

The scattering angle is changed, for example, by a rotation unit 36 described below rotating the scattered light measurement unit 14 around the sample cell 16, and can be two angles or more. A parameter setting unit 13 is configured with the incidence setting unit 12 and the rotation unit 36 described below. As described above, at least one of the scattering angle or the measurement wavelength is set as the measurement parameter by the parameter setting unit 13.

The measurement wavelength is changed by appropriately switching the first light source unit 20 and the second light source unit 22, and the measurement wavelength can be two wavelengths or more. For example, laser light having different wavelengths is emitted as measurement light from the first light source unit 20 and the second light source unit 22.

From this, the light source units according to the number of measurement wavelengths are provided, and the present invention is not limited to the first light source unit 20 and the second light source unit 22. In a case where the measurement wavelength is not changed, one of the first light source unit 20 and the second light source unit 22 may be provided. The light sources may be increased to increase the number of measurement wavelengths.

The sample cell 16 is, for example, a rectangular parallelepiped or columnar container formed of optical glass or optical plastic. The dispersion liquid Lq including at least one type of particles as a measurement target is stored in the sample cell 16. The dispersion liquid Lq is irradiated with laser light as input light to the dispersion liquid Lq.

The sample cell 16 may be disposed inside an immersion bath (not shown). The immersion bath is provided to eliminate a refractive index difference or to make a temperature uniform.

The scattered light measurement unit 14 measures the scattering intensity of the scattered light generated by scattering of laser light in the dispersion liquid Lq as described above.

The scattered light measurement unit 14 obtains a plurality of pieces of scattering intensity data by measuring a scattering intensity of scattered light emitted from the dispersion liquid Lq by measurement light a plurality of times while changing the value of the measurement parameter set by the parameter setting unit 13 a plurality of times.

The scattered light measurement unit 14 has a polarizer 30 that transmits only a given polarized component of scattered light from the sample cell 16, a condenser lens 32 that focuses scattered light on a light detection unit 34, and the light detection unit 34 that detects scattered light.

To appropriately set a scattering volume of a sample, a first pinhole (not shown) and a second pinhole (not shown) may be provided.

As the polarizer 30, a polarizer according to polarized light to be detected, such as circularly polarized light, linearly polarized light, or elliptically polarized light, is suitably used. The polarizer 30 may be configured in such a manner that a polarizer that detects circularly polarized light and a polarizer that detects linearly polarized light are provided in parallel and are switched according to polarized light to be detected, and the light intensity of each polarized component of scattered light may be detected by the light detection unit 34.

In a case where it is not necessary to measure the light intensity of the polarized component of scattered light, the polarizer 30 is not always required.

The light detection unit 34 is not particularly limited as long as the intensity of scattered light can be detected, and for example, a photomultiplier tube, a photodiode, an avalanche photodiode, and a time correlator are used.

The rotation unit 36 that rotates the scattered light measurement unit 14 to change an angle of scattered light is provided. An angle of a scattering angle θ can be changed by the rotation unit 36. The angle of the scattering angle θ is a scattering angle. In FIG. 1, the angle of the scattering angle is 90°. That is, the scattering angle is 90°. As the rotation unit 36, for example, a goniometer is used. For example, the scattered light measurement unit 14 is placed on the goniometer as the rotation unit 36, and the scattering angle θ is adjusted by the goniometer.

The light scattering measurement device 10 has the first light source unit 20 and the second light source unit 22 that emit different kinds of laser light as described above, whereby dynamic light scattering measurement can be performed using the measurement wavelength of two wavelengths or more, and a plurality of pieces of scattering intensity data are obtained for the particles in the dispersion liquid Lq.

The light scattering measurement device 10 has the rotation unit 36 that rotates the scattered light measurement unit 14 as described above, whereby dynamic light scattering measurement can be performed while changing the angle of the scattering angle θ, that is, the value of the scattering angle by two angles or more, and a plurality of pieces of scattering intensity data are obtained for the particles in the dispersion liquid Lq.

The calculation unit 18 specifies a material of each type of particle of particles included in the dispersion liquid, which is the dispersion liquid Lq including at least one type of particles, based on the intensity of the scattered light detected by the light detection unit 34. The calculation unit 18 stores a theoretical formula that defines a relationship of a refractive index, a particle diameter, and a scattering intensity described below, and the calculation unit 18 performs fitting described below.

The calculation unit 18 calculates scattering intensity time variation characteristic data and scattering intensity parameter-dependent data from a plurality of pieces of scattering intensity data obtained by the scattered light measurement unit 14, fits the calculated scattering intensity time variation characteristic data and the calculated scattering intensity parameter-dependent data using the theoretical formula or a simulation based on a theory of electromagnetic wave behavior that defines the relationship of the refractive index, the particle diameter, and the scattering intensity, specifies a combination of the number of types of particles in the dispersion liquid, a refractive index of a particle, and a particle size distribution of the particle by the fitting, and specifies a material of each type of particle of the specified particles in the dispersion liquid. The fitting will be described below.

The scattering intensity time variation characteristic data of the measurement parameter and the scattering intensity parameter-dependent data of the measurement parameter calculated by the simulation based on the theory of electromagnetic wave behavior, instead of the theoretical formula that defines the relationship of the refractive index, the particle diameter, and the scattering intensity, may be used.

In the calculation unit 18, the calculated scattering intensity time variation characteristic data of the measurement parameter described above is calculated based on a Stokes-Einstein's theoretical formula. For example, the scattering intensity parameter-dependent data is calculated based on at least one of a Mie scattering theoretical formula, a discrete dipole approximation method (DDA method), or a finite-difference time-domain method (FDTD method). The discrete dipole approximation method (DDA method) and the finite-difference time-domain method (FDTD method) correspond to the simulation based on the theory of electromagnetic wave behavior. A method corresponding to the simulation based on the theory of electromagnetic wave behavior can be suitably used, and is not particularly limited to the discrete dipole approximation method (DDA method) and the finite-difference time-domain method (FDTD method) described above.

The theoretical formula is not particularly limited to the above-described formula, and various theoretical formulas, such as a scattering theory, can be suitably used.

A program (computer software) stored in a read only memory (ROM) or the like is executed by the calculation unit 18, whereby the calculation unit 18 obtains the particle size distribution of the particle as described above. The calculation unit 18 may be configured with a computer in which the program is executed as described above, so that each part functions, may be a dedicated device in which each part is configured with a dedicated circuit, or may be configured with a server as being executed on a cloud.

In measuring the scattering intensity of the dispersion liquid, there is a scattering angle as a measurement parameter. In a case where the measurement parameter is the scattering angle, the scattering intensity of the dispersion liquid is measured while changing the value of the scattering angle as the value of the measurement parameter by two angles or more. In this case, for example, the measurement wavelength is fixed to one wavelength.

In a case where the measurement parameter is the measurement wavelength of measurement light, the scattering intensity of the dispersion liquid is measured using the measurement wavelength of two wavelengths or more. In this case, for example, the scattering angle is fixed to one angle. The two wavelengths are the value of the measurement parameter.

As the measurement parameter, the scattering angle and the measurement wavelength. In this case, the value of the scattering angle is two angles or more, the measurement wavelength is two wavelengths or more, and the scattering intensity of the dispersion liquid is measured by combination of the scattering angles and the measurement wavelengths.

The value of the scattering angle is not particularly limited as long as two angles or more are provided, but is suitably decided from the number of pieces of scattering intensity data, a measurement time, and the like. It is preferable that the value of the scattering angle is more than 0° and equal to or less than 180°.

The measurement wavelength is not particularly limited as long as two wavelengths or more are provided. The measurement wavelength is suitably decided considering that, in a case where the measurement wavelengths increase, more light sources are required, and an optical element that separates wavelengths is required.

The measurement light is not particularly limited, and light of respective wavelengths, such as ultraviolet light, visible light, and infrared light, can be suitably used.

Although the scattering intensity can be measured by one measurement device with the light scattering measurement method or device as described above, measurement data of two different devices of the dynamic light scattering measurement device and a light scattering goniophotometer may be used in combination. In a case of the wavelength, a spectrometer may be employed. As described above, a device form is not limited as using the light scattering measurement device 10 shown in FIG. 1.

The particles in the dispersion liquid are at least one type and are a plurality of types. That is, assuming that the particles in the dispersion liquid are a plurality of types, a theoretical formula that defines a relationship of a refractive index, a particle diameter, and a scattering intensity is set, and a material of each type of particle of the particles is specified.

(First Example of Light Scattering Measurement Method)

Figure 2:
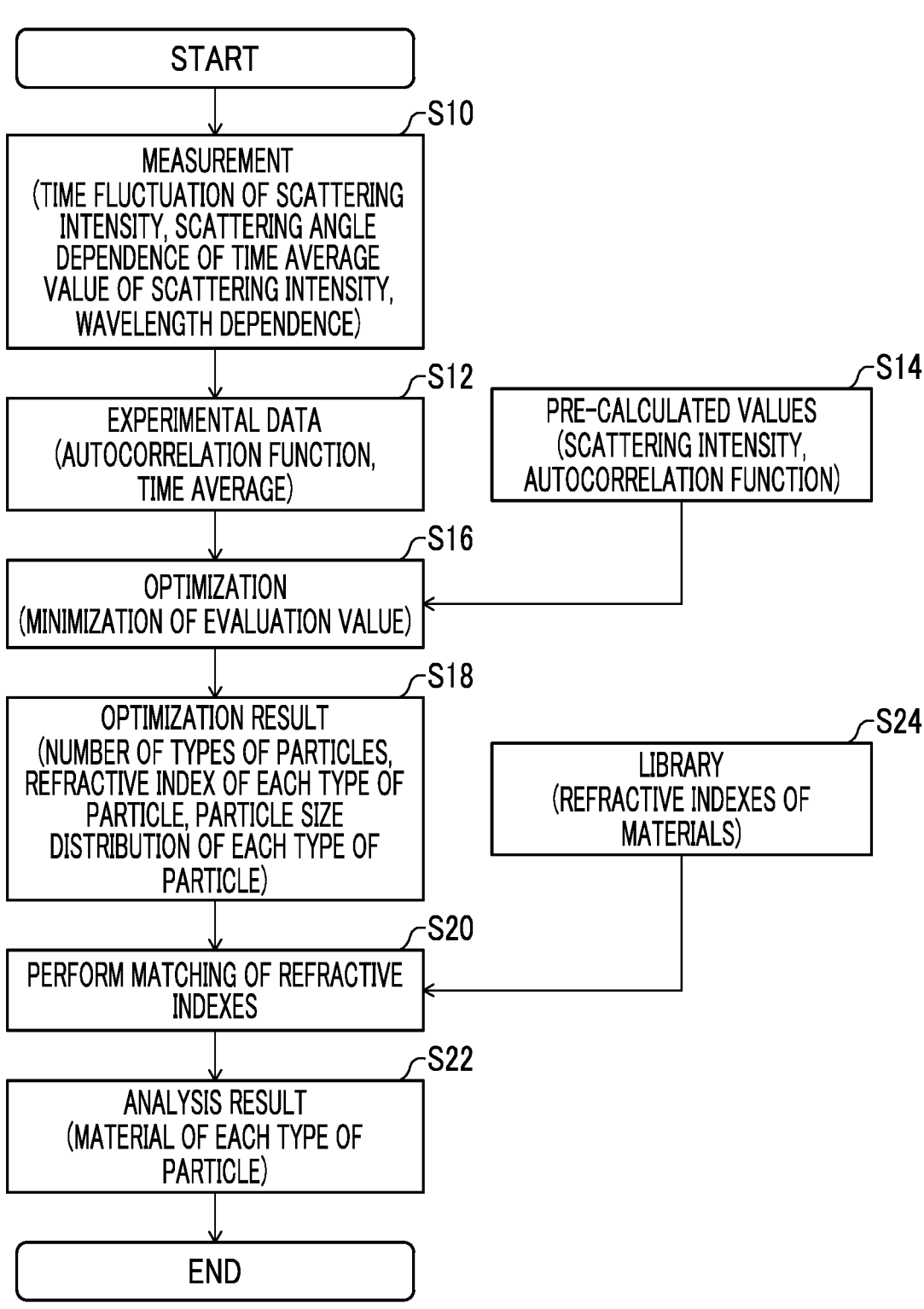
FIG. 2 is a flowchart showing a first example of a light scattering measurement method of the embodiment of the present invention.

FIG. 2 is a flowchart showing a first example of a light scattering measurement method of the embodiment of the present invention.

In the first example of the light scattering measurement method, the measurement parameter is the scattering angle, and the scattering intensity of the dispersion liquid is measured while changing the value of the scattering angle by two angles or more.

As shown in FIG. 2, the first example of the light scattering measurement method has, for example, a measurement step (Step S10), a step of obtaining experimental data (Step S12), a step of obtaining pre-calculated values (Step S14), an optimization step (Step S16), a step of obtaining a result of optimization (Step S18), a step of performing matching of refractive indexes (Step S20), and a step of obtaining an analysis result (Step S22). In addition, a step of preparing a library (Step S24) is provided. Through the step of obtaining the analysis result (Step S22), the material of each type of particle of the particles included in the dispersion liquid is specified.

The library associates materials and refractive indexes of the materials with each other. The refractive index of the library is a measured value or a value described in the documents or the like. The refractive index may be a complex refractive index. For example, the library is stored in the calculation unit 18.

In the calculation unit 18, matching of refractive indexes using the refractive indexes of the materials of the library is performed. The calculation unit 18 calculates pre-calculated values described above and executes a series of processing for calculating the pre-calculated values.

In the measurement step (Step S10), at least one of the scattering angle or the measurement wavelength is set as the measurement parameter, and the scattering intensity of the scattered light emitted from the dispersion liquid by measurement light is measured a plurality of times while changing the value of the set measurement parameter a plurality of times. In the measurement step (Step S10), for example, time fluctuation of the scattering intensity and scattering angle dependence of a time average value of the scattering intensity are measured.

In the step of obtaining experimental data (Step S12), for example, an autocorrelation function with respect to the time fluctuation of the scattering intensity is obtained based on a measured value of the measurement step (Step S10). The scattering angle dependence of the time average value of the scattering intensity or a wavelength-dependent time average value of the scattering intensity is obtained. With this, for example, the scattering intensity per scattering angle shown in FIG. 3 is obtained.

Figure 3:
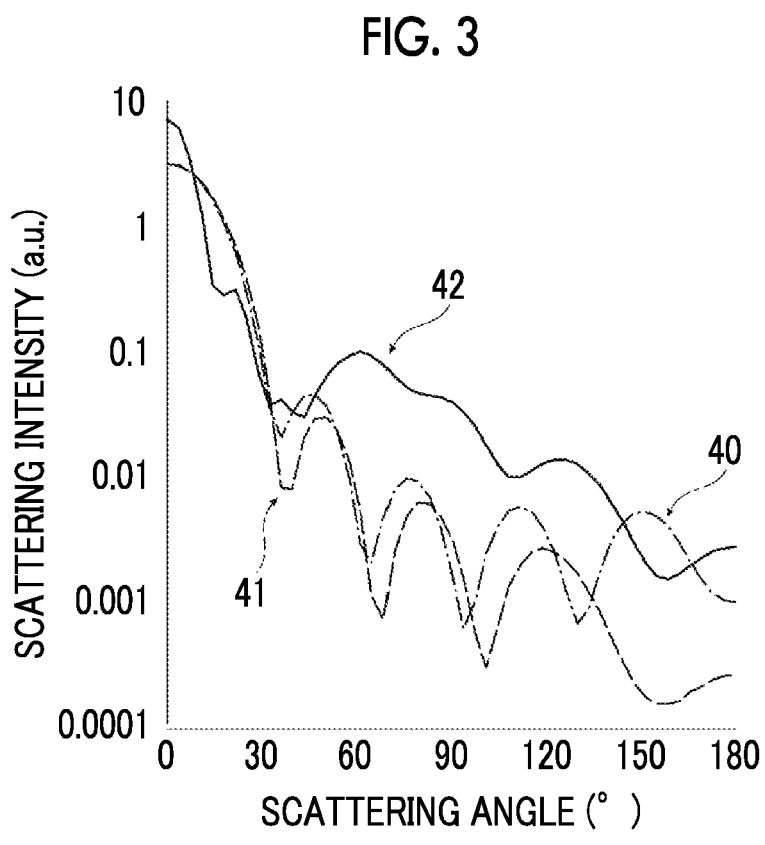
FIG. 3 is a graph showing calculated values of a scattering angle and a scattering intensity of each refractive index of particles having the same particle size.

Here, FIG. 3 is a graph showing calculated values of a scattering angle and a scattering intensity of each refractive index of particles having the same particle size, and shows a profile of the scattering intensity obtained by calculation. In FIG. 3, reference numerals 40 is a profile showing a relationship between scattering angle and a scattering angle for a refractive index of 1.48. Reference numeral 41 is a profile showing a relationship between a scattering angle and a scattering angle for a refractive index of 1.59. Reference numeral 42 is a profile showing a relationship between a scattering angle and a scattering angle for a refractive index of 2.2. As shown in FIG. 3, in a case where the particles have the same particle size but have different refractive indexes, the profile of the scattering intensity with respect to the scattering angle is different.

In the step of obtaining the pre-calculated values (Step S14), for example, a calculated value of the scattering intensity using the theoretical formula or the simulation based on the theory of electromagnetic wave behavior that defines the relationship of the refractive index, the particle diameter, and the scattering intensity. In addition, the scattering intensity time variation characteristic data of the measurement parameter and the scattering intensity parameter-dependent data of the measurement parameter calculated by the theoretical formula that defines the relationship of the refractive index, the particle diameter, and the scattering intensity are obtained. Alternatively, the scattering intensity time variation characteristic data of the measurement parameter and the scattering intensity parameter-dependent data of the measurement parameter calculated by the simulation based on the theory of electromagnetic wave behavior are obtained.

In Step S14, for example, the scattering intensity parameter-dependent data is calculated based on at least one of a Mie scattering theoretical formula, a discrete dipole approximation method (DDA method), or a Stokes-Einstein's theoretical formula. The numerical calculated values of the scattering intensity and the scattering intensity parameter-dependent data may be obtained using a finite-difference time-domain (FDTD) method that is a known numerical calculation method. In Step S14, a measured value of the scattering intensity using known particles, such as standard particles, may be obtained. The pre-calculated values obtained in Step S14 are used in specification of the number of types of particles, a refractive index of each type of particle, and a particle number.

In the optimization step (Step S16), for example, the autocorrelation function and the theoretical formula of the scattering intensity are fitted to the autocorrelation function of the time fluctuation of the scattering intensity and the time average value of the scattering intensity obtained in Step S12. In Step S16, after initial values are set for the number of types of particles of the particles included in the dispersion liquid, the refractive index of each type of particle, and the particle number, the values are updated such that an evaluation value is minimized, to specify a combination of the final number of types of particles of the particles, the refractive index of each type of particle, and the particle number. The initial value is set by generating a random variable.

Next, after a result of optimization is obtained (Step S18), matching of the refractive index of each type of particle of the particles, for which the combination of the number of types of particles in the dispersion liquid, the refractive index of the particle, and the particle size distribution of the particle is specified by the fitting, and the refractive index of the material of the library is performed (Step S20). With this, the material of each type of particle of the particles included in the dispersion liquid is specified, and the material of each type of particle of the particles included in the dispersion liquid is obtained as an analysis result (Step S22). In the matching of the refractive indexes (Step S20), for example, a refractive index is selected such that the square of a refractive index difference is minimized. The refractive index of the material is prepared as the library in advance (Step S24).

Hereinafter, the light scattering measurement method will be described in detail, including fitting.

First, the dispersion liquid Lq is irradiated with, for example, laser light having the wavelength of 632.8 nm or 633 nm from the second light source unit 22 shown in FIG. 1. Scattered light scattered by irradiation is detected by the light detection unit 34 at a predetermined scattering angle for a predetermined time. With this, the scattering intensity of the dispersion liquid Lq at the scattering angle can be obtained.

Next, the rotation unit 36 rotates the scattered light measurement unit 14 to change the scattering angle θ, and the scattering intensity of the dispersion liquid Lq is obtained. The change of the scattering angle and the measurement of the scattering intensity of the dispersion liquid Lq are repeatedly performed, and the scattering intensity of the dispersion liquid Lq is measured a plurality of times. The value of the scattering angle is two angles or more, and for example, the scattering intensity is measured for every 5° from 30° to 160°. The above step is the measurement step, and corresponds to Step S10 described above.

Next, the calculation unit 18 calculates the scattering intensity time variation characteristic data from the time dependence of the scattering intensity of the dispersion liquid Lq obtained by the measurement step. The scattering intensity time variation characteristic data is an autocorrelation function or a power spectrum.

The autocorrelation function is calculated from the scattering intensity of the dispersion liquid using a known method. The power spectrum is also calculated from the scattering intensity of the dispersion liquid using a known method.

In this manner, the scattering intensity time variation characteristic data is obtained for each scattering angle. That is, there are a plurality of pieces of time variation data.

Next, the calculation unit 18 calculates the scattering intensity parameter-dependent data from the scattering intensity of the dispersion liquid obtained by the measurement step.

The scattering intensity parameter-dependent data of the dispersion liquid is obtained, for example, by calculating the time average value of the scattering intensity of the dispersion liquid for each scattering angle. With this, data of the scattering intensity pr scattering angle shown in FIG. 3 is obtained.

The above step of calculating the scattering intensity time variation characteristic data of the dispersion liquid and the scattering intensity parameter-dependent data of the dispersion liquid is the calculation step, and corresponds to Step S12 described above.

Next, in the calculation unit 18, the scattering intensity time variation characteristic data of the scattering angle of two angles or more, and a plurality of pieces of scattering intensity parameter-dependent data are fitted to the theoretical formula or the simulation based on the theory of electromagnetic wave behavior that defines the relationship of the refractive index, the particle diameter, and the scattering intensity. The combination of the number of types of particles in the dispersion liquid, the refractive index of the particle, and the particle size distribution of the particle is specified by the above-described fitting. This corresponds to Steps S16 and S18 described above.

As described above, at least one type of particles is included in the dispersion liquid.

A linear autocorrelation function is represented by $g^{(1)}(\tau) = \exp(-Dq^2\tau)$. In regard to a relationship between a diffusion coefficient obtained from the autocorrelation function and a particle size, a Stokes-Einstein's formula that is used in a normal dynamic light scattering method is applied.

In a case where there is a particle size distribution in the particles, the linear autocorrelation function is represented by Expression (1) described below. The scattering intensity is represented by Expression (2) described below. Expressions (1) and (2) described below are theoretical formulas, and both $I_\theta^{total}$ in Expressions (1) and (2) are calculated values.

$$g_\theta^{(1)}(\tau) = \sum_{d=d_0}^{d_M} \frac{N_d I_\theta(d, m)}{I_\theta^{total}} \exp\left(-D_d q_\theta^2 \tau\right) \tag{1}$$

$$I_\theta^{total} = \sum_{d=d_0}^{d_M} N_d I_\theta(d, m) \tag{2}$$

In Expression (1), $g^{(1)}$ indicates the linear autocorrelation function. The linear autocorrelation function of Expression (1) is the linear autocorrelation function per scattering angle. The scattering intensity of Expression (2) is the scattering intensity per scattering angle. For this reason, Expressions (1) and (2) are obtained for each scattering angle to be measured.

In Expressions (1) and (2), $I_\theta^{total}$ indicates a total scattering intensity. d indicates a particle diameter. Each of subscripts 0 to M of d indicates an ordinal number of a bin of a histogram of the particles. N indicates a particle number. D indicates a diffusion coefficient. A subscript d of the diffusion coefficient D represents dependence on the particle diameter d. q indicates a scattering vector. $\tau$ indicates a time lag of the linear autocorrelation function. 0 indicates a scattering angle. I indicates a scattering intensity. A subscript d of the scattering intensity I represents dependence on the particle diameter d. A subscript $\theta$ of the scattering intensity I represents dependence on the scattering angle $\theta$. The bins of the histogram are data sections, and are represented by bars in the histogram.

A portion $N_d I_{d,\theta}/I_\theta^{total}$ indicates a ratio of a scattering intensity of all single particles belonging to the bin of the particle diameter d to the total scattering intensity.

A scattering intensity with respect to particles having the particle diameter d and a relative complex refractive index m is given by the following expression according to a Mie scattering theory. The following expression is the theoretical formula that defines the relationship of the refractive index, the particle diameter, and the scattering intensity.

$$I_\theta(d, m) = \frac{\lambda^2}{4\pi^2 r^2} \left| \sum_{i=0}^{\infty} (-i)^l \left[ A_l P_l'(\cos\theta)\sin\theta - B_l \frac{P_l(\cos\theta)}{\sin\theta} \right] \right|^2$$

Here, $P_1$ is a function obtained by partially differentiating the Legendre polynomial with $\theta$, and a subscript 1 represents an order of the Legendre polynomial. $\lambda$ indicates a wavelength in a solvent. d is a particle diameter, r is a distance from a particle, and m is a relative complex refractive index of the particle with respect to the medium. In a case where a refractive index of the medium is no, and a refractive index of the particle is n, $m=n/n_0$. In addition, coefficients $A_1(m,d)$ and $B_1(m,d)$ are given by the following expressions. In the following expressions, ' is a differential regarding a factor in each function.

$$A_1(m, d) = i^{l+1} \frac{2l + 1}{l(l + 1)} \frac{m\psi_1'(x)\psi_1(mx) - \psi_1(x)\psi_1'(mx)}{m\zeta_1'(x)\psi_1(mx) - \zeta_1(x)\psi_1'(mx)}$$

$$B_1(m, d) = i^{l+1} \frac{2l + 1}{l(l + 1)} \frac{m\psi_1(x)\psi_1'(mx) - \psi_1'(x)\psi_1(mx)}{m\zeta_1'(x)\psi_1'(mx) - \zeta_1'(x)\psi_1(mx)}$$

x is represented by the following expression. $\psi_1(\rho)$ and $\zeta_1(\rho)$ are represented by the following expressions, and in the following expressions, J is the Bessel function, and ( is the Hankel function.

$$x(d) = \frac{\pi d}{\lambda}$$

$$\psi_1(\rho) = \sqrt{\frac{\pi\rho}{2}} J_{1+\frac{1}{2}}(\rho)$$

-continued
$$\zeta_1(\rho) = \sqrt{\frac{\pi\rho}{2}} H_{1+\frac{1}{2}}(\rho)$$

In a case where the number of types of particles is two, the number of terms is two, and Expressions (1) and (2) described above become Expressions (3) and (4) described below. The same applies to a case where the number of types of particles is three or more as in a case where the number of types of particles is two.

$$g_\theta^{(1)}(\tau) = \sum_{d=d_0}^{d_M} \frac{N_d^A I_\theta^A(d, m)}{I_\theta^{total}} \exp(-D_d q^2 \tau) + \sum_{d=d_0}^{d_M} \frac{N_d^B I_\theta^B(d, m)}{I_\theta^{total}} \exp(-D_d q^2 \tau) \quad (3)$$

$$I_\theta^{total} = \sum_{d=d_0}^{d_M} N_d^A I_\theta^A(d, m) + \sum_{d=d_0}^{d_M} N_d^B I_\theta^B(d, m) \quad (4)$$

<First Example of Fitting>

Hereinafter, the fitting for specifying the number of types of particles of the particles in the dispersion liquid and the material of each type of particle will be described.

A secondary autocorrelation function $g^{(2)}(\tau)$ is measured for each scattering angle, and while it is desirable that the scattering angle is two angles or more, but may be one angle. The number of scattering angles for measurement is suitably decided according to the number of variables to be calculated or the number of pieces of scattering intensity parameter-dependent data of the measurement parameter.

In the fitting, in regard to the linear autocorrelation function per scattering angle, an initial particle number is set with the number of types of particles, the refractive index of each type of particle, and the particle number as variables in Expressions (1), (3) or similar expressions for three types of particles or more. A calculated value of the linear autocorrelation function of Expression (1) based on the set initial particle number is obtained. A calculated value of the secondary autocorrelation function $g^{(2)}(\tau)=1+\beta\cdot|g^{(1)}(\tau)|^2$ is obtained from the calculated value of the linear autocorrelation function. $\beta$ is a device constant.

A difference between the measured value of the secondary autocorrelation function and the calculated value of the secondary autocorrelation function is obtained for each scattering angle. The difference between the measured value of the secondary autocorrelation function and the calculated value of the secondary autocorrelation function is referred to as a difference in secondary autocorrelation function. The difference in secondary autocorrelation function is obtained for each scattering angle. The calculated value of the secondary autocorrelation function per scattering angle corresponds to the scattering intensity time variation characteristic data of the measurement parameter calculated by the theoretical formula.

The total scattering intensity $I^{total}$ is measured for each scattering angle. In Expressions (2), (4) or similar expressions even for three types of particles or more, a value of the total scattering intensity $I_\theta^{total}$ of Expressions (2), (4) or similar expressions for three types of particles or more based on the set initial values is calculated.

A difference between the measured value of the total scattering intensity $I_\theta^{total}$ shown in FIG. 3 and the calculated value of the total scattering intensity $I_\theta^{total}$ of Expressions (2), (4) or similar expressions for three types of particles or more is calculated for each scattering angle. The difference between the measured value of the total scattering intensity $I^{total}$ and the calculated value of the total scattering intensity $I_\theta^{total}$ of Expressions (2), (4) or similar expressions for three types of particles or more at any scattering angle is referred to as a difference in total scattering intensity $I^{total}$ at the scattering angle. In regard to the total scattering intensity $I^{total}$, the difference in total scattering intensity $I^{total}$ at the scattering angle is obtained. The calculated value of the total scattering intensity $I_\theta^{total}$ of Expressions (2), (4), and the like corresponds to the scattering intensity parameter-dependent data of the measurement parameter calculated by the theoretical formula.

In the fitting, to calculate the final number of types of particles of the particles, the refractive index of each type of particle, and the particle number, the difference in secondary autocorrelation function obtained for each scattering angle and the difference in total scattering intensity at the scattering angle are used. For example, an evaluation value obtained by adding a value of the square of the difference in secondary autocorrelation function obtained for each scattering angle and a value of the square of the difference in total scattering intensity at the scattering angle for all scattering angles is used. A combination of the number of types of particles, the refractive index of each type of particle, and the particle number with which the evaluation value is minimized is set as the combination of the final number of types of particles of the particles, the refractive index of each type of particle, and the particle number. Because the type of particle and the particle number are obtained, the particle size distribution of each type of particle is obtained.

In the fitting, the number of types of particles, the relative complex refractive index m of each type of particle, and the particle number are repeatedly updated in Expressions (3), (4), and the like according to the number of types of particles such that the evaluation value is minimized, to obtain the final particle number and the relative complex refractive index m. This corresponds to Step S16 described above. In the fitting, in a case where the number of types of particles, the relative complex refractive index m of each type of particle, and the particle number are repeatedly updated such that the evaluation value is minimized, for example, the number of types of particles, the relative complex refractive index m of each type of particle, and the particle number are updated using a genetic algorithm. With this, the number of types of particles, the relative complex refractive index m of each type of particle, and the particle number can be updated more reliably.

In the fitting, the values of the particle number and the relative complex refractive index m are updated in Expressions (3), (4), and the like according to the number of types of particles as described above while reflecting the expression indicating the relative complex refractive index m described above, and the measured values and the calculated values are fitted, so that the final particle number and the relative complex refractive index m are obtained. The refractive index is fitted through the expression indicating the relative complex refractive index m described above.

The histogram of the particles can be obtained by obtaining the particle number with respect to the particle diameters of all types of particles. That is, the particle diameter distribution of the particle can be obtained for all types of particles by obtaining $N_d^A$ . . . for all $d=d_0$ to $d_M$ in the particles.

The above step is a step of obtaining the combination of the number of types of particles, the relative complex refractive index m of each type of particle, and the particle size distribution (Step S18). The evaluation value that is used for the fitting is not limited to the value described above.

Matching of the finally obtained refractive index of each type of particle and the refractive index of the material of the library is performed (Step S20), and the material of each type of particle is obtained as an analysis result (Step S22). In the matching, for example, selection is made such that the square of a refractive index difference between the obtained refractive index of the particle and the refractive index of the material of the library is minimized.

The above step is a step of specifying a material of each type of particle of unknown particles included in the dispersion liquid. The evaluation value that is used for the fitting is not limited to the value described above.

Measurement results at different wavelengths can also be added to the calculated wavelength dependence of the refractive index, in addition to the scattering angle. That is, the scattered light intensity is measured using a plurality of measurement wavelengths of two wavelengths or more to obtain a plurality of pieces of scattering intensity data, and a combination of the number of types of particles, the refractive index of each type of particle, and the particle size distribution can also be calculated. In this case, the scattering angle may be one angle or may be two angles or more.

The wavelength dependence of the refractive index can be obtained by changing the measurement wavelength. The wavelength dependence of the refractive index is also called refractive index distribution. In a case where the measurement wavelength is changed as the measurement parameter, the number of measurement wavelengths is not limited to two and may be three or four wavelengths as long as the number of measurement wavelengths is plural.

Figure 4:
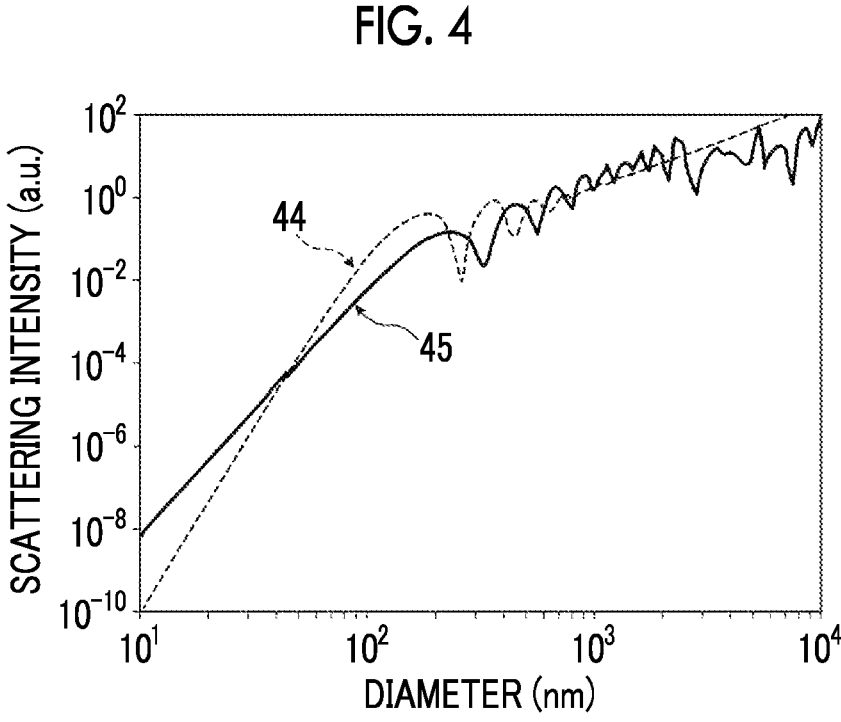
FIG. 4 is a graph showing an example of a relationship between a scattering intensity and a measurement wavelength.
Figure 5:
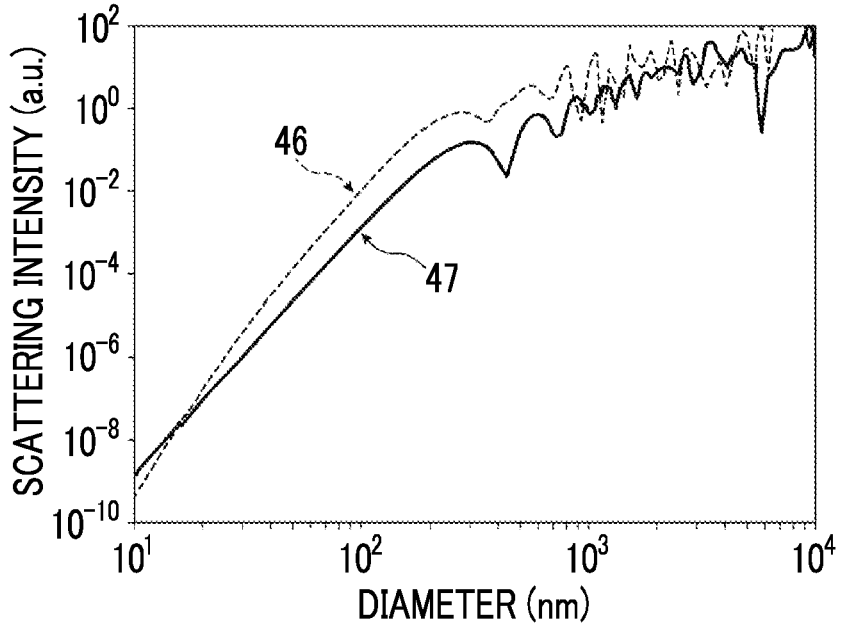
FIG. 5 is a graph showing another example of the relationship between the scattering intensity and the measurement wavelength.

Here, FIGS. 4 and 5 show a relationship between a scattering intensity and a measurement wavelength. FIG. 4 shows scattering intensities of two type of particles having different refractive indexes calculated at the measurement wavelength of 488 nm. As shown in FIG. 4, a profile 44 of a scattering intensity of a first particle and a profile 45 of a scattering intensity of a second particle are different.

FIG. 5 shows scattering intensities of two types of particles calculated at the measurement wavelength of 632.8 nm. As shown in FIG. 5, a profile 46 of a scattering intensity of a first particle and a profile 47 of a scattering intensity of a second particle are different. As shown in FIGS. 4 and 5, the scattering intensity with respect to the measurement wavelength is different depending on the difference in refractive index. The type of particle can be specified using this point.

For example, the scattering intensity parameter-dependent data of the dispersion liquid is obtained by calculating the time average value of the scattering intensity of the dispersion liquid for each laser light wavelength.

An optimization method of the fitting is not limited to the method described above, and for example, Bayesian optimization can be used for the fitting.

As described above, although the secondary autocorrelation function is used in calculating the number of types of particles of the particles included in the dispersion liquid, the refractive index of each type of particle, and the particle number, the present invention is not limited thereto, and a power spectrum can also be used, in place of the secondary autocorrelation function. In a case where the linear autocorrelation function is measured through heterodyne detection, the linear autocorrelation function may be used.

For the fitting, in addition to the theoretical formula, scattering intensity time variation characteristic data of the measurement parameter and scattering intensity parameter-dependent data of the measurement parameter calculated by a simulation can also be used.

(Second Example of Light Scattering Measurement Method)

Figure 6:
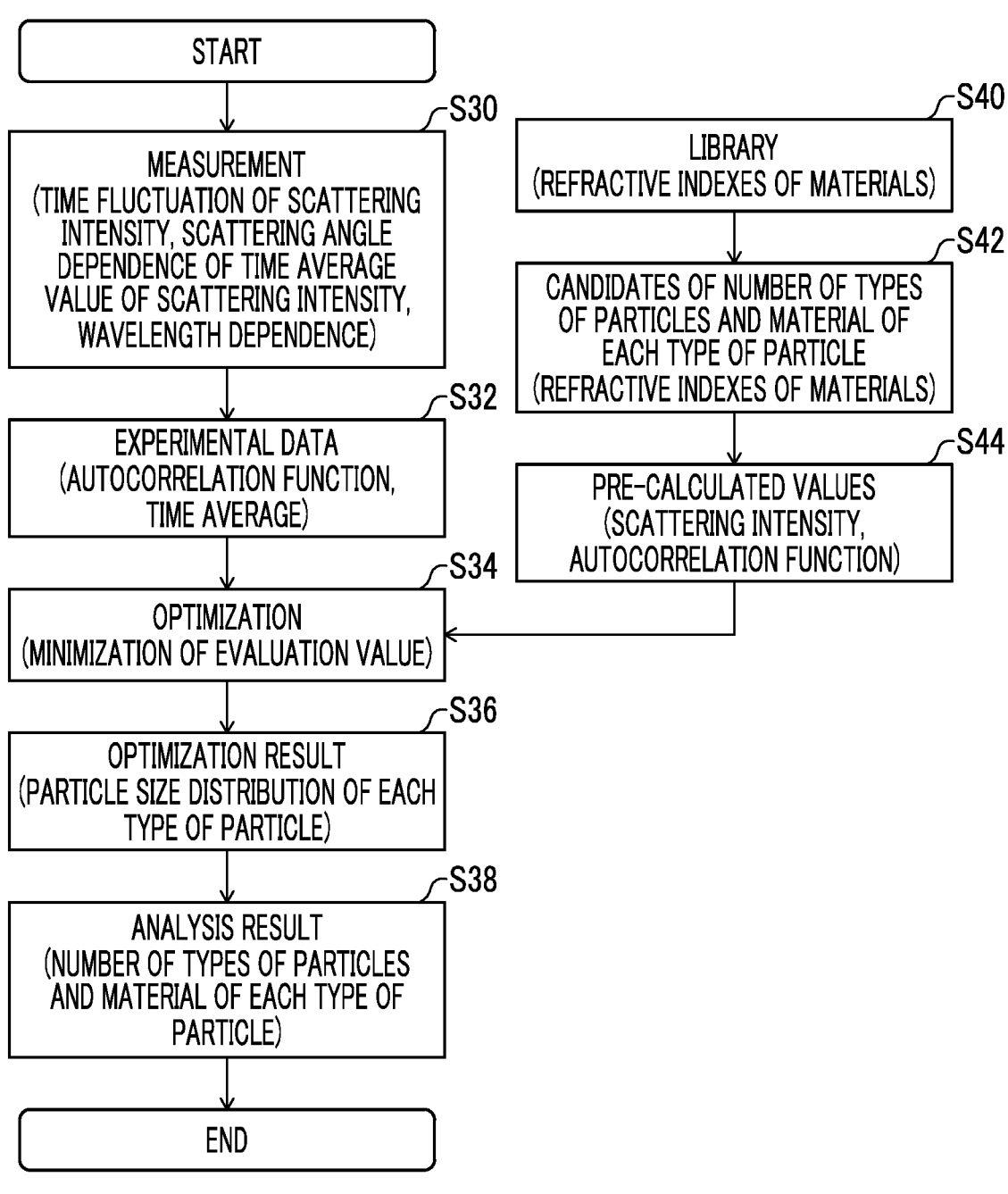
FIG. 6 is a flowchart illustrating a second example of a light scattering measurement method of the embodiment of the present invention.

FIG. 6 is a flowchart showing a second example of a light scattering measurement method of the embodiment of the present invention.

In the second example of the light scattering measurement method, detailed description of the same steps as in the first example of the light scattering measurement method shown in FIG. 2 will not be repeated.

The second example of the light scattering measurement method is different from the first example of the light scattering measurement method in that optimization is evaluated, and the refractive index of the library is used as the pre-calculated value, and other portions are the same as in the first example of the light scattering measurement method.

The second example of the light scattering measurement method has a measurement step (Step S30), a step of obtaining experimental data (Step S32), an optimization step (Step S34), a step of obtaining a result of optimization (Step S36), and a step of obtaining an analysis result (Step S38) as in the first example of the light scattering measurement method. In addition, a step of preparing a library (Step S40), a step of listing candidates of the number of types of particles and the material of each type of particle using the library (Step S42), and a step of obtaining pre-calculated values (Step S44). Through the step of obtaining the analysis result (Step S38), the material of each type of particle of the particles included in the dispersion liquid is specified.

Because the measurement step (Step S30), the step of obtaining experimental data (Step S32), and the optimization step (Step S34) are the same as the measurement step (Step S10), the step of obtaining experimental data (Step S12), and the optimization step (Step S16) of the first example of the light scattering measurement method, detailed description thereof will not be repeated.

In the second example of the light scattering measurement method, the candidates of the number of types of particles and the material of each type of particle are selected using the prepared library (Step S40) (Step S42). The pre-calculated values are obtained based on the selected candidates of the number of types of particles and the material of each type of particle (Step S44).

In Step sS40, S42, and S44, refractive index data of candidate materials are extracted as an initial value from the library by the candidate number of types of particles (Step S40). An initial value of a particle size distribution of a candidate type of particle is prepared (Step S42). A scattering intensity and a secondary autocorrelation function are calculated using the refractive index data of the candidate type of particle and the initial value of the particle size distribution of the candidate type of particle (Step S44). The candidates of the number of types of particles and the material of each type of particle are set as the pre-calculated values, and the calculated value of the scattering intensity and the calculated value of the secondary autocorrelation function are obtained.

On the other hand, in Step S32, the measured value of the scattering intensity per scattering angle is obtained. The secondary autocorrelation function $g^{(2)}(\tau)$ is measured for each scattering angle.

In the optimization step (Step S34), the measured values of Step S32 and the pre-calculated values of Step S44 are compared and fitted. In this case, for example, similarly to the first example of the fitting, the difference in secondary autocorrelation function obtained for each scattering angle described above and the difference in total scattering intensity at the scattering angle are used. For example, an evaluation value obtained by adding a value of the square of the difference in secondary autocorrelation function obtained for each scattering angle and a value of the square of the difference in total scattering intensity at the scattering angle for all scattering angles is used.

The refractive index data of the candidate type of particle is extracted from the library such that the evaluation value is minimized (Step S40), the particle size distribution of the candidate type of particle is set (Step S42), and the scattering intensity and the secondary autocorrelation function are calculated for the candidate type of particle (Step S44). A combination of a particle number with which the evaluation value is minimized, a candidate material for which the evaluation value is minimized, and the number of types of particles of the candidate material is obtained. The combination is set as an optimum solution, and a combination of the final number of types of particles, the refractive index of each type of particle, and the particle size distribution included in the dispersion liquid is obtained (Step S36). With this, the number of types of particles of the particles included in the dispersion liquid and the material of each type of particle can be specified as an analysis result (Step S38).

In the selection of the candidates of the number of types of particles and the material of each type of particle (Step S42) for obtaining the pre-calculated values (Step S44), for example, a genetic algorithm is used. Furthermore, in the above-described optimization of the particle size distribution (Step S34), that is, the fitting, for example, a genetic algorithm is used. In the above-described steps, because the genetic algorithm is used, the certainty of the selection of the candidates of the number of types of particles and the material of each type of particle (Step S42) increases. The certainty of the above-described optimization of the particle size distribution (Step S34) also increases.

The number of types of particles included in the dispersion liquid may be determined in advance. That is, the number of types of particles may be set in advance as a convergence condition. In this case, in Step S40, refractive index data of the candidate type of particle is extracted with the number of types of particles determined in advance (Step S40), a candidate of the material of each type of particle is listed (Step S42), and pre-calculation is performed (Step S44).

<Second Example of Fitting>

A second example of fitting is different from the first example of the fitting in that the candidates of the number of types of particles and the material of each type of particle are selected from the library of the refractive indexes of the materials, and the refractive indexes are used.

In the second example of the fitting, in the fitting, to calculate the particle number, the difference in secondary autocorrelation function obtained for each scattering angle described above and the difference in total scattering intensity at the scattering angle are used. For example, an evaluation value obtained by adding a value of the square of the difference in secondary autocorrelation function obtained for each scattering angle and a value of the square of the difference in total scattering intensity at the scattering angle for all scattering angles is used. The particle number with which the evaluation value is minimized is calculated.

In the fitting, the number of types of particles, the relative complex refractive index m of each type of particle, and the particle number are repeatedly updated in Expressions (3), (4), and the like according to the number of types of particles such that the evaluation value is minimized, to obtain the final particle number and the relative complex refractive index m. This corresponds to Step S16 described above. In the fitting, in a case where the number of types of particles, the relative complex refractive index m of each type of particle, and the particle number are repeatedly updated such that the evaluation value is minimized, for example, the number of types of particles, the relative complex refractive index m of each type of particle, and the particle number are updated using a genetic algorithm. With this, the number of types of particles, the relative complex refractive index m of each type of particle, and the particle number can be updated more reliably.

In the fitting, the values of the particle number and the relative complex refractive index m are updated in Expressions (3), (4), and the like according to the number of types of particles as described above while reflecting the expression indicating the relative complex refractive index m described above, and the measured values and the calculated values are fitted, so that the final particle number and the relative complex refractive index m are obtained. The refractive index is fitted through the expression indicating the relative complex refractive index m described above.

As described above, the particle number with which the evaluation value is minimized, the candidate material in the particle number with which the evaluation value is minimized, and the number of types of the particles of the candidate material are set as an optimum solution, and a combination of the final number of types of particles, the refractive index of each type of particle, and the particle size distribution is obtained (Step S36). With this, the number of types of particles of the particles included in the dispersion liquid and the material of each type of particle can be specified as an analysis result (Step S38).

The above step is a step of specifying the material of each type of particle of the particles included in the dispersion liquid.

The evaluation value that is used for the fitting is not limited to the above-described evaluation value even in the second example of the fitting.

Similarly to the first example of the fitting, the measurement wavelength is changed and measurement is performed at a plurality of measurement wavelengths of two wavelengths or more as described above, whereby wavelength dependence of the refractive index can be obtained. In a case where the measurement wavelength is changed, the number of measurement wavelengths is not limited to two, and the number of measurement wavelengths may be three or four as long as the number of measurement wavelengths is plural.

In the measurement step, a light intensity of a polarized component of the scattered light of the dispersion liquid obtained by irradiating the dispersion liquid with measurement light having specific polarization may be measured as a scattering intensity. The measurement step is executed by the scattered light measurement unit 14.

Figure 7:
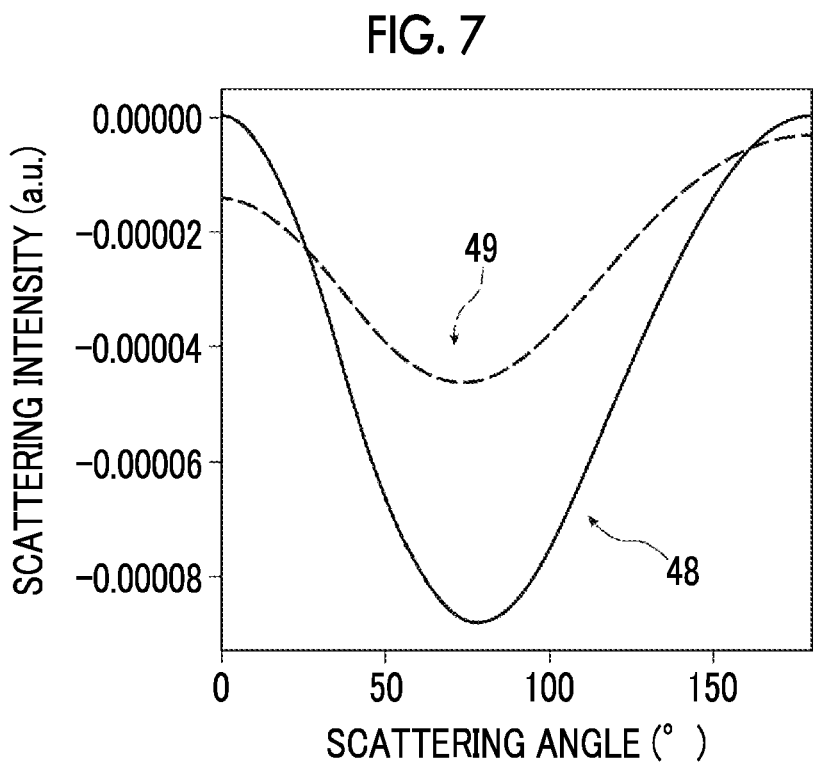
FIG. 7 is a graph showing a relationship between a scattering intensity and a scattering angle of each shape of particle.

For example, the dispersion liquid Lq of the sample cell 16 is irradiated with circularly polarized laser light as measurement light, and a polarized component of the scattered light of the dispersion liquid Lq is measured. In regard to the light intensity of the polarized component of scattered light, for example, a difference between a light intensity of vertically linearly polarized light and a light intensity of horizontally linearly polarized light is measured as a scattering intensity. In this case, as in the first example of the above-described light scattering measurement method, in a case where measurement is performed while changing the scattering angle, a graph that shows a relationship between a scattering intensity and a scattering angle shown in FIG. 7 can be obtained. As shown in FIG. 7, a profile 48 of a scattering intensity of the spherical particle and a profile 49 of a scattering intensity of the disc-shaped particle are different.

Vertically linearly polarized light refers to that a direction of linearly polarized light is vertical in a case where a scattering surface is horizontal. Horizontally linearly polarized light refers to that a direction of linearly polarized light is horizontal in a case where the scattering surface is horizontal.

In the measurement step, at least one of scattering intensity parameter-dependent data obtained by successively irradiating the dispersion liquid with measurement light having a plurality of polarization states or scattering intensity parameter-dependent data obtained by extracting a polarized component of scattered light emitted from the dispersion liquid a plurality of times may be measured. The measurement step is executed by the scattered light measurement unit 14 and the polarizer 28.

The scattering intensity parameter-dependent data obtained by successively irradiating the dispersion liquid with measurement light having a plurality of polarization states is obtained by bringing measurement light into the polarization state. The scattering intensity parameter-dependent data obtained by extracting the polarized component of scattered light emitted from the dispersion liquid a plurality of times is obtained by detecting the polarized component of scattered light without bringing measurement light into the polarization state. Data obtained by bringing measurement light into the polarization state and detecting the polarized component of the scattered light is also included in the above-described scattering intensity parameter-dependent data.

For example, in a case where polarization is used, the polarization state of measurement light can be circularly polarized light, and a difference between a vertically polarized light intensity and a horizontally polarized light intensity can be used for the polarized component of scattered light. For example, the polarization state of measurement light can be 45° linearly polarized light, and a sum of a vertically polarized light intensity and a horizontally polarized light intensity can be used for the polarized component of scattered light.

The present invention is basically configured as described above. Although the light scattering measurement device and the light scattering measurement method of the present invention have been described above in detail, the present invention is not limited to the above-described embodiment, and various improvements or alterations may be of course made without departing from the gist of the present invention.

EXAMPLES

Hereinafter, the features of the present invention will be further specifically described with reference to an example. Any materials, reagents, mass of substances and their ratios, operations and so forth shown in Example below may appropriately be altered, without departing from the spirit of the present invention. Accordingly, the scope of the present invention is not limited to the following example.

In the present example, light scattering measurement of a dispersion liquid including particles is performed using the scattering angle and the measurement wavelength as the measurement parameter, and specification of a material of each type of particle of the particles included in the dispersion liquid is tested. A sample 1 is used as the dispersion liquid. The sample 1 is an aqueous dispersion liquid including unknown particles and uses pure water as a solvent.

(First Light Scattering Measurement Method)

In regard to the sample 1, the specification of the material of each type of particle of the particles is tested using the light scattering measurement device shown in FIG. 1 based on the first example of the light scattering measurement method shown in FIG. 2.

To obtain an autocorrelation function, time dependence of a scattered light intensity at each scattering angle is measured under a measurement condition of the measurement wavelength of 488 nm and 632.8 nm and the scattering angle of 50°, 90°, and 140°, to calculate a secondary autocorrelation function. Measurement results are shown in FIGS. 8 and 9.

Figure 8:
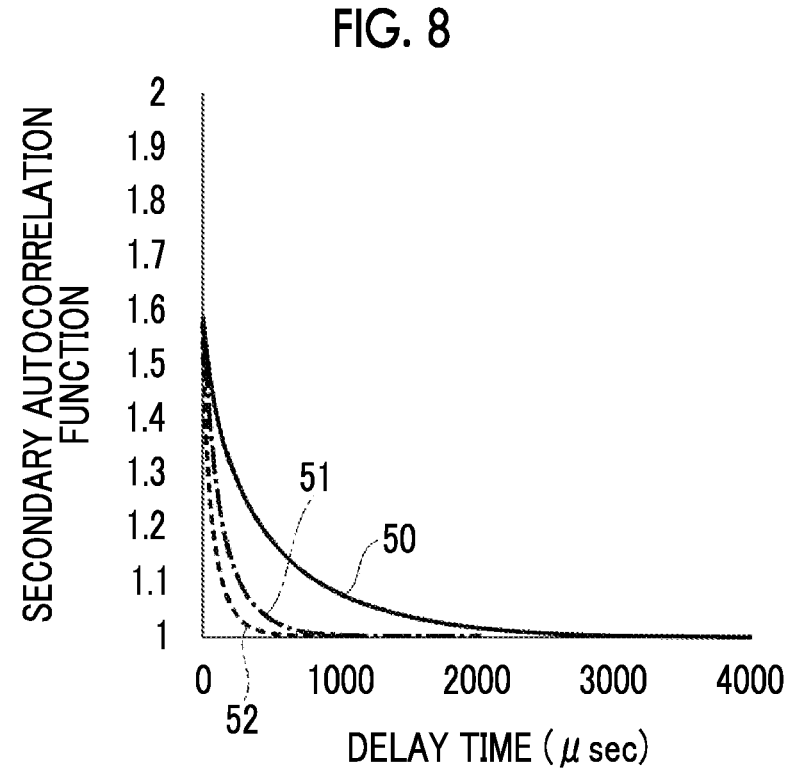
FIG. 8 is a graph showing a measurement result of a secondary autocorrelation function of a sample 1 at a measurement wavelength of 488 nm.
Figure 9:
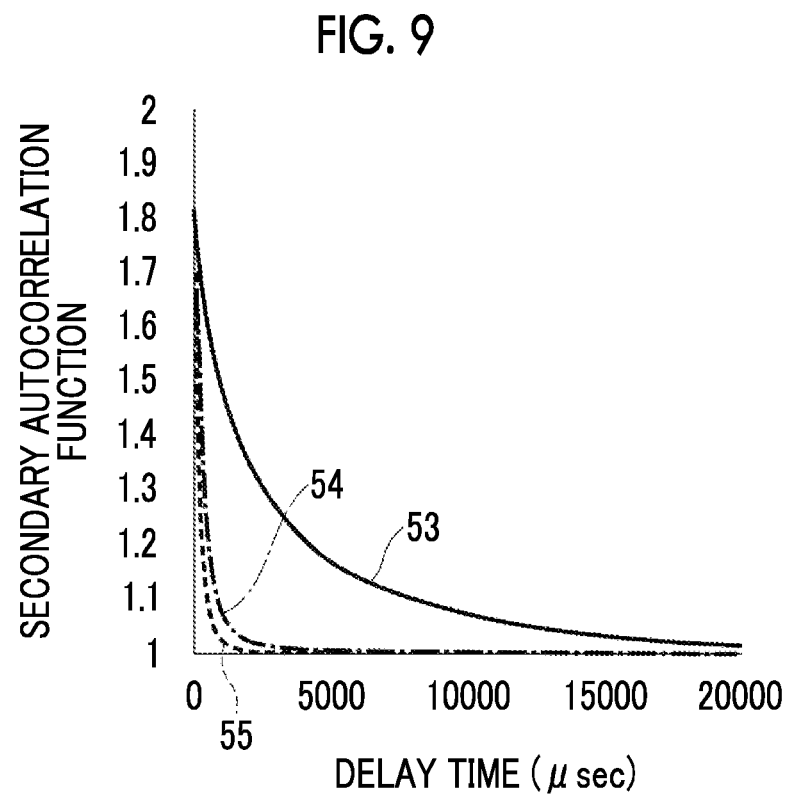
FIG. 9 is a graph showing a measurement result of a secondary autocorrelation function of the sample 1 at a measurement wavelength of 632.8 nm.

Here, FIG. 8 is a graph showing a measurement result of the secondary autocorrelation function of the sample 1 at the measurement wavelength of 488 nm, and FIG. 9 is a graph showing a measurement result of the secondary autocorrelation function of the sample 1 at the measurement wavelength of 632.8 nm.

In FIG. 8, reference numeral 50 indicates the secondary autocorrelation function at the scattering angle of 50° for the measurement wavelength of 488 nm. Reference numeral 51 indicates the secondary autocorrelation function at the scattering angle 90° for the measurement wavelength of 488 nm. Reference numeral 52 indicates the secondary autocorrelation function at the scattering angle of 140° for the measurement wavelength of 488 nm.

In FIG. 9, reference numeral 53 indicates the secondary autocorrelation function at the scattering angle of 50° for the measurement wavelength of 632.8 nm. Reference numeral 54 indicates the secondary autocorrelation function at the scattering angle of 90° for the measurement wavelength of 632.8 nm. Reference numeral 55 indicates the secondary autocorrelation function at the scattering angle of 140° for the measurement wavelength of 632.8 nm.

In regard to the scattering intensity, the scattering intensity is measured under a measurement condition that the measurement wavelengths are 488 nm and 632.8 nm and the scattering angle is changed in a range of 30 to 160° by 5°. A measurement result of the scattering intensity is shown in FIG. 10.

Figure 10:
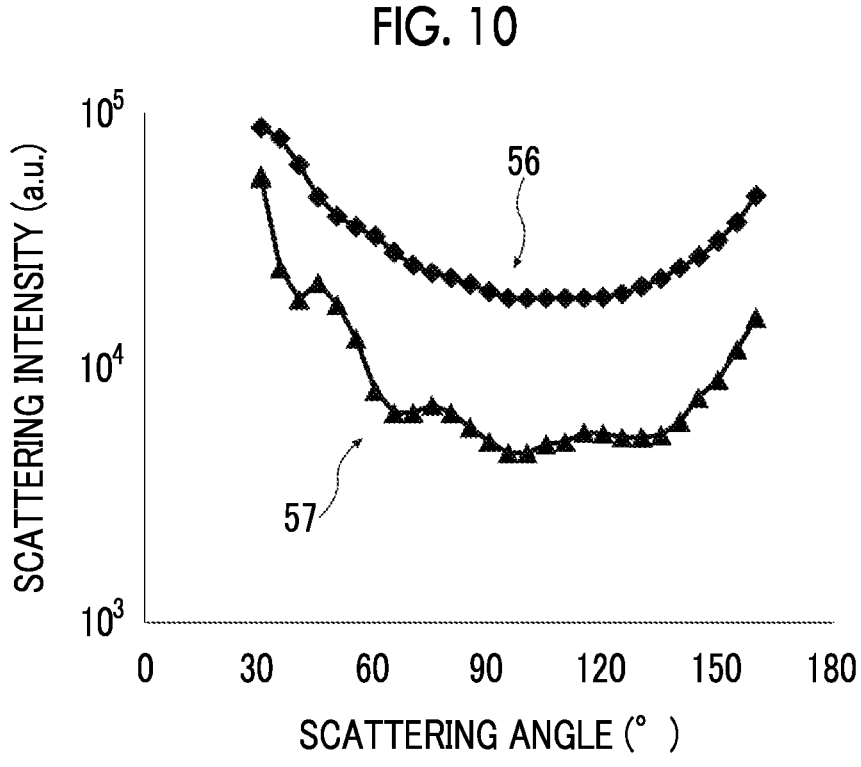
FIG. 10 is a graph showing a relationship between a scattering intensity and a scattering angle of the sample 1 at the measurement wavelengths of 488 nm and 632.8 nm.

Here, FIG. 10 is a graph showing a relationship between a scattering intensity and a scattering angle of the sample 1 at the measurement wavelength of 488 nm and 632.8 nm. In FIG. 10, reference numeral 56 indicates a profile of a scattering intensity at the measurement wavelength of 488 nm. Reference numeral 57 indicates a profile of a scattering intensity at the measurement wavelength of 632.8 nm.

In regard to the sample 1, the number of types of particles is a maximum of two. That is, the number of types of particles is one or two.

In regard to the sample 1, an initial particle number is set as the number of types of particles, the refractive index of each type of particle, and the particle number as variables. The calculated value of the linear autocorrelation function of Expression (1) described above is calculated based on the set initial particle number. As described above, the calculated value of the secondary autocorrelation function $g^{(2)}(\tau)=1+\beta \cdot g^{(1)}(\tau)|^2$ is calculated from the calculated value of the linear autocorrelation function. R is a device constant.

A difference between the measured value of the secondary autocorrelation function and the calculated value of the secondary autocorrelation function is obtained for each scattering angle.

The total scattering intensity $I^{total}$ is measured for each scattering angle. In Expressions (2) and (4), the value of the total scattering intensity $I_\theta^{total}$ of Expressions (2) and (4) based on the set initial value is calculated.

The difference between the measured value of the total scattering intensity $I^{total}$ shown in FIG. 10 and the calculated value of the total scattering intensity $I_\theta^{total}$ of Expressions (2) and (4) is calculated for each scattering angle. The difference between the measured value of the total scattering intensity $I^{total}$ and the calculated value of the total scattering intensity $I_\theta^{total}$ of Expressions (2) and (4) at any scattering angle is referred to as the difference in total scattering intensity $I_\theta^{total}$ at the scattering angle. In regard to the total scattering intensity $I^{total}$, the difference in total scattering intensity $I_\theta^{total}$ at the scattering angle is obtained.

In the fitting, to calculate the final number of types of particles of the particles, the refractive index of each type of particle, and the particle number, the difference in secondary autocorrelation function obtained for each scattering angle and the difference in total scattering intensity at the scattering angle are used. For example, an evaluation value obtained by adding a value of the square of the difference in secondary autocorrelation function obtained for each scattering angle and a value of the square of the difference in total scattering intensity at the scattering angle for all scattering angles is used. A combination of the number of types of particles, the refractive index of each type of particle, and the particle number with which the evaluation value is minimized is set as the combination of the final number of types of particles of the particles, the refractive index of each type of particle, and the particle number.

Matching of the finally obtained refractive index of each type of particle and the refractive index of the material of the library is performed, and the material of each type of particle is obtained. As shown in Table 1, the complex refractive indexes of the materials are stored in the library. PS of Table 1 indicates polystyrene.

The complex refractive index is represented by n+ik. n is a refractive index, and k is an extinction coefficient. The candidate material may be searched similarly using an absolute value of the complex refractive index, instead of n and k of the complex refractive index.

Figure 11:
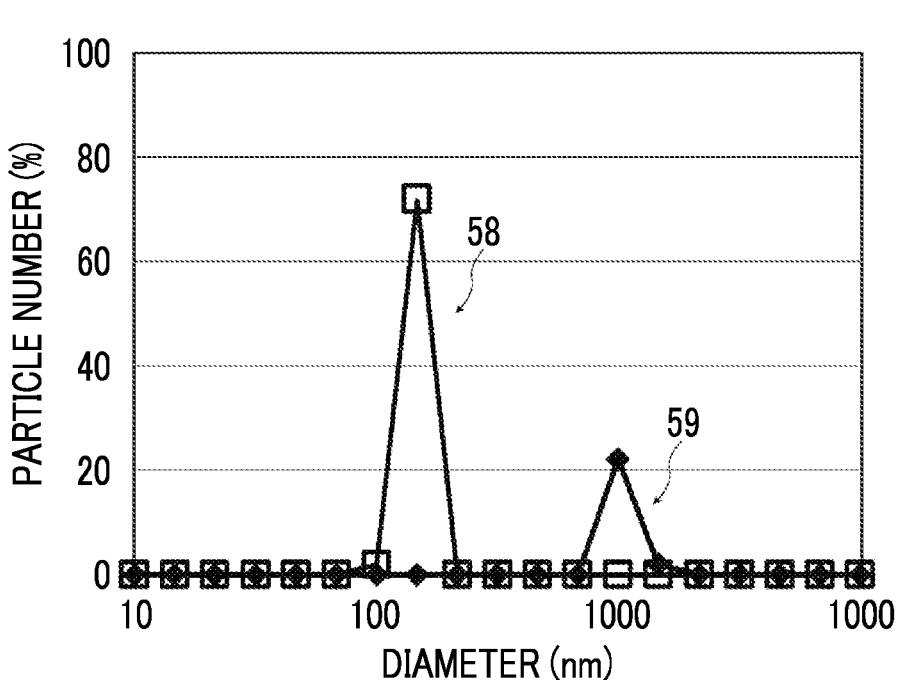
FIG. 11 is a graph showing a particle size distribution of the sample 1.

As a result of analysis, the number of types of particles of the sample 1 is two. One of the two types or particles is denoted as X and another is denoted as Y. The refractive index is calculated to be 2.4+i0.3 ($\lambda$=488 nm) and 2.1 ($\lambda$=632.8 nm) for the particle X, and is calculated to be 1.6 ($\lambda$=488 nm, $\lambda$=632.8 nm) for the particle Y. As the particle diameter distributions of the particle X and the particle Y, particle size distributions shown in FIG. 11 are obtained.

In matching, a difference between a measured complex refractive index or an absolute value of the complex refractive index and a library value of a complex refractive index of a material prepared in advance or an absolute value of the complex refractive index is calculated, and a square sum of the difference with each wavelength component is obtained and set as a second evaluation value. A material having a complex refractive index with which the second evaluation value is minimized or an absolute value of the complex refractive index is specified as the material in the sample.

As a result of matching of the obtained refractive index and the library (see Table 1), the material of the particle X is specified as a pigment A, and the material of the particle Y is specified as polystyrene.

Here, FIG. 11 is a graph showing a particle size distribution of the sample 1. In FIG. 11, reference numeral 58 indicates the particle size distribution of the particle X, and reference numeral 59 indicates a particle size distribution of the particle Y.

TABLE 1

| Material | 488 nm | | 632.8 nm | |
| --- | --- | --- | --- | --- |
| | n | k | n | k |
| PS | 1.59 | 0.00 | 1.60 | 0.00 |
| TiO$_2$ | 2.90 | 0.00 | 2.73 | 0.00 |
| Pigment A | 2.37 | 0.29 | 2.07 | 0.00 |

(Second Light Scattering Measurement Method)

In regard to the sample 1, the specification of the material of each type of particle of the particles is tested using the light scattering measurement device of FIG. 1 based on the second example of the light scattering measurement method shown in FIG. 6.

The autocorrelation function is calculated in the same manner as the above-described first light scattering measurement method.

The scattering intensity is calculated in the same manner as the above-described first light scattering measurement method.

As in the above-described first light scattering measurement method, in regard to the sample 1, the number of types of particles is a maximum of two.

Next, the refractive index data of the candidate material is extracted as an initial value by the candidate number of types of particles from the library in which the relationship between the material and the complex refractive index is shown as shown in Table 1. Even in regard to the particle size distribution, an initial value is prepared by a random variable. The scattering intensity and the autocorrelation function are calculated using the refractive index data and the initial value of the particle size distribution, the measured values and the calculated values are evaluated using the evaluation value, and optimization is performed.

The refractive index data and the particle size distribution are updated to repeat evaluation based on the evaluation value, and finally, the particle size distribution in a case where the evaluation value is minimized and the candidate material and the candidate number of types of particles in this case are set as an optimum solution.

Figure 12:
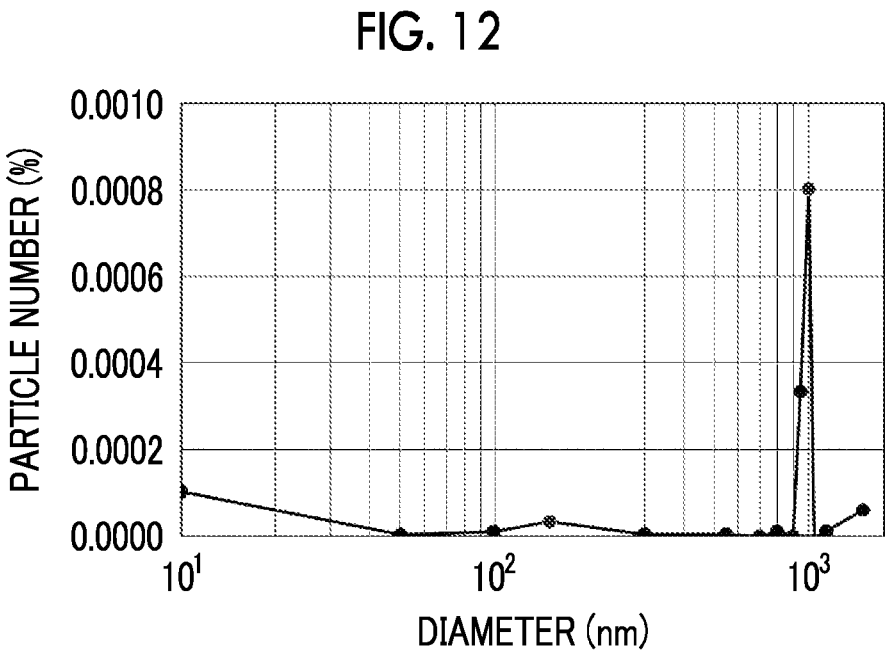
FIG. 12 is a graph showing a particle size distribution of polystyrene particles included in the sample 1.
Figure 13:
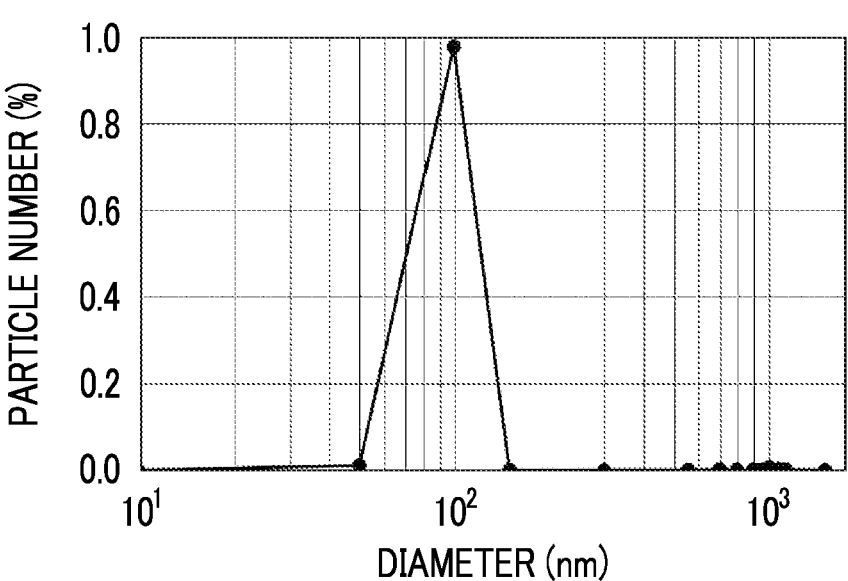
FIG. 13 is a graph showing a particle size distribution of a pigment A included in the sample 1.

As a result of analysis, the evaluation function is minimized for a combination of polystyrene and the pigment A and for the particle size distributions shown in FIGS. 12 and 13. A fitting result of the measured value and the optimized calculation is shown in FIGS. 14 to 17.

As a result of analysis, the number of types of particles of the sample 1 is two, not one. The materials of the two types of particles are specified as the pigment A (refractive index 2.37+0.28i ($\lambda$=488 nm) and 2.07 ($\lambda$=632.8 nm)) and a polystyrene particle (refractive index 1.59 ($\lambda$=488 nm, $\lambda$=632.8 nm)).

The particle size distribution shown in FIG. 12 is obtained for the polystyrene particle, and the particle size distribution shown in FIG. 13 is obtained for the pigment A.

Figure 14:
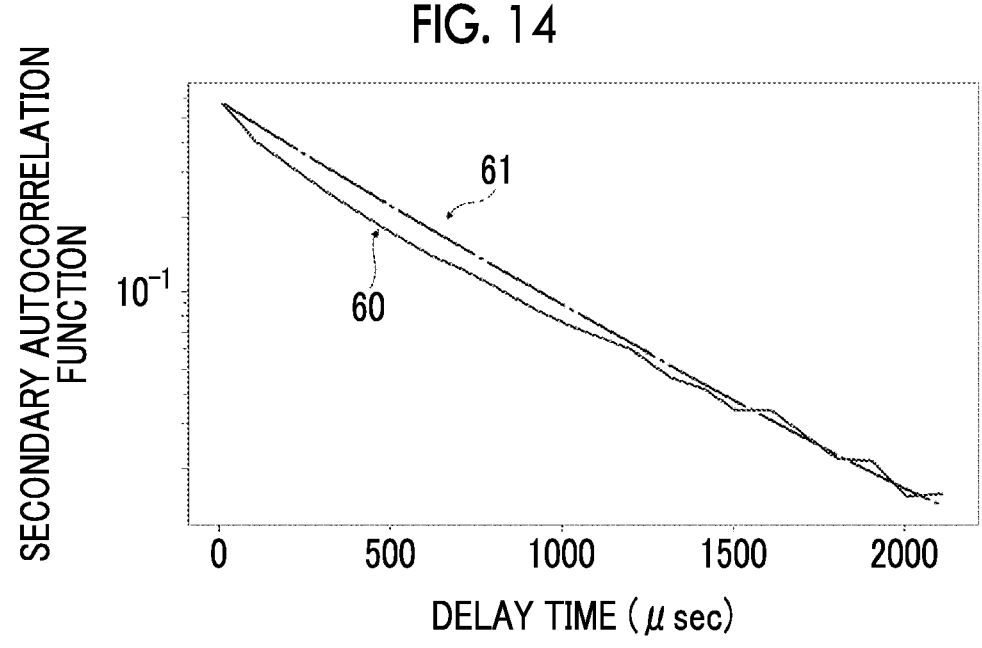
FIG. 14 is a graph showing a secondary autocorrelation function of the sample 1 at the measurement wavelength of 488 nm and a scattering angle of 50°.

Here, FIG. 14 is a graph showing a secondary autocorrelation function of the sample 1 at a measurement wave-

Figure 15:
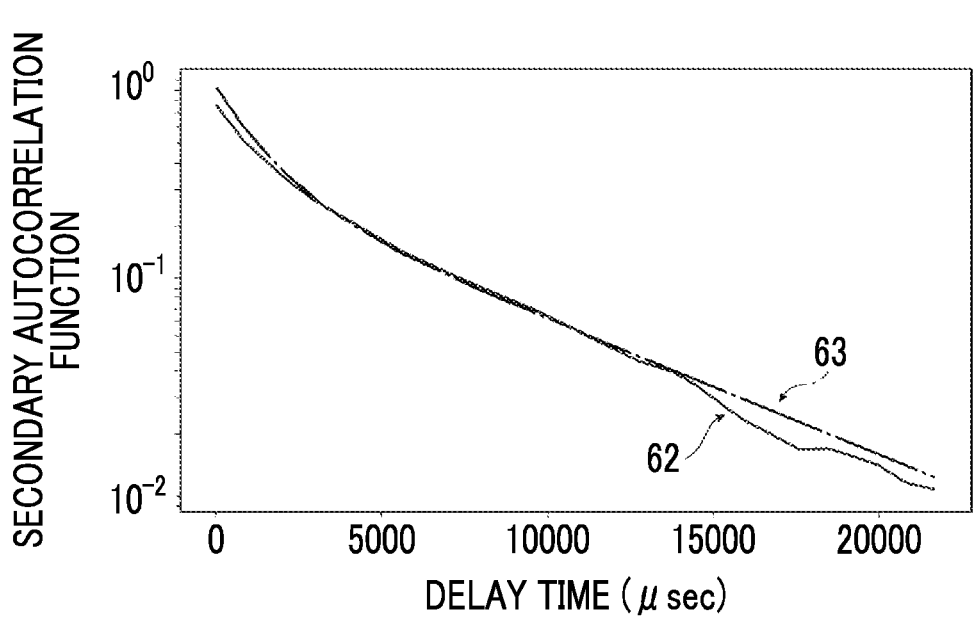
FIG. 15 is a graph showing a secondary autocorrelation function of the sample 1 at the measurement wavelength of 632.8 nm and the scattering angle of 50°.
Figure 16:
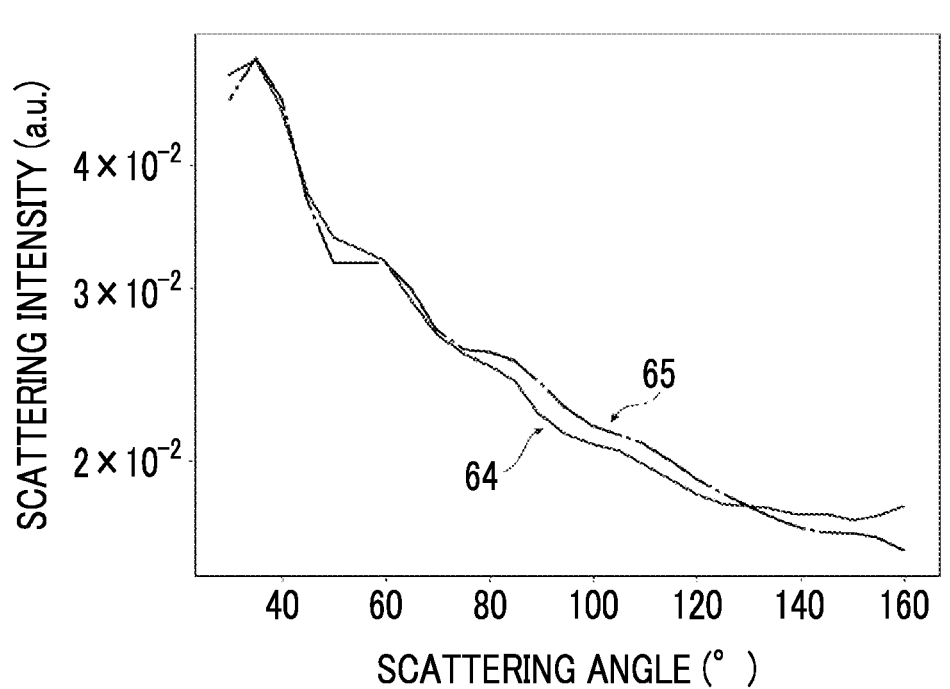
FIG. 16 is a graph showing a relationship between a scattering intensity and a scattering angle of the sample 1 at the measurement wavelength of 488 nm.
Figure 17:
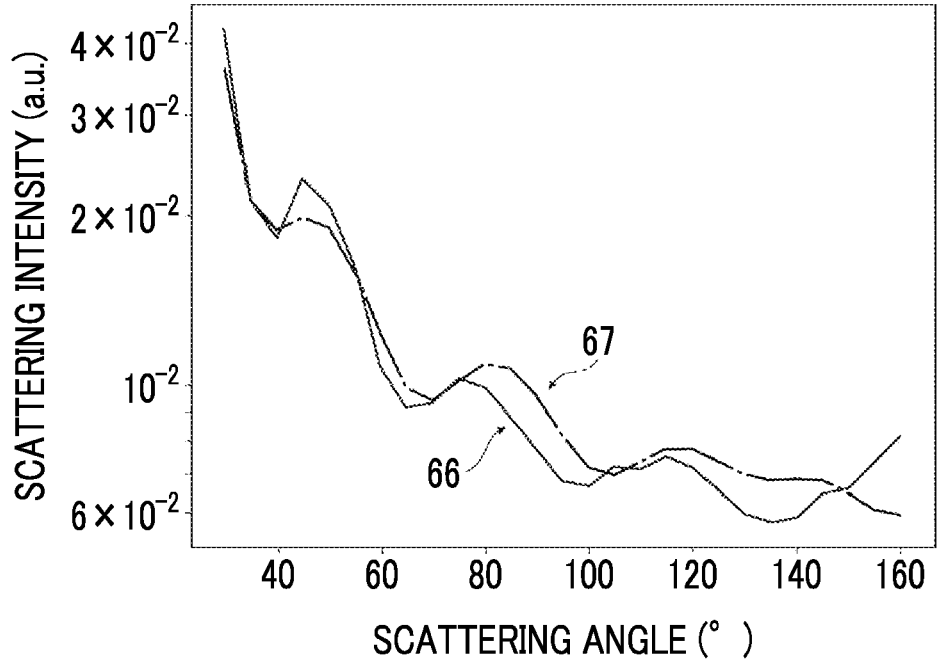
FIG. 17 is a graph showing a relationship between a scattering intensity and a scattering angle of the sample 1 at the measurement wavelength of 632.8 nm.

24 length of 488 nm and a scattering angle of 50°, and FIG. 15 is a graph showing a secondary autocorrelation function of the sample 1 at a measurement wavelength of 632.8 nm and a scattering angle of 50°. FIG. 16 is a graph showing a relationship between a scattering intensity and a scattering angle of the sample 1 at the measurement wavelength of 488 nm, and FIG. 17 is a graph showing a relationship between a scattering intensity and a scattering angle of the sample 1 at the measurement wavelength of 632.8 nm.

A fitting result of the measured value and the optimized calculation is examined. As shown in FIG. 14, for the secondary autocorrelation function at the measurement wavelength of 488 nm and the scattering angle of 50°, a profile 60 indicating a measured value and a profile 61 by the fitting substantially match each other.

As shown in FIG. 15, for the secondary autocorrelation function at the measurement wavelength of 632.8 nm and the scattering angle of 50°, a profile 62 indicating a measured value and a profile 63 by the fitting substantially match each other.

The secondary autocorrelation function is calculated by $g^{(2)}(\tau)=1+\beta \cdot |g^{(1)}(\tau)|^2$ described above.

As shown in FIG. 16, to the scattering intensity at the measurement wavelength of 488 nm, a profile 64 indicating a measured value and a profile 65 by the fitting substantially match each other.

As shown in FIG. 17, for the scattering intensity at the measurement wavelength of 632.8 nm, a profile 66 indicating a measured value and a profile 67 by the fitting substantially match each other.

EXPLANATION OF REFERENCES

10: light scattering measurement device
12: incidence setting unit
13: parameter setting unit
14: scattered light measurement unit
16: sample cell
18: calculation unit
20: first light source unit
21$a$: first shutter
21$b$: second shutter
22: second light source unit
24: half mirror
26, 32: condenser lens
28, 30: polarizer
34: light detection unit
36: rotation unit
40, 41, 42, 44, 45, 46, 47, 48, 49: profile
50, 51, 52, 53, 54, 55: secondary autocorrelation function
60, 61, 62, 63, 64, 65, 66, 67: profile
56, 57: profile of scattering intensity
58: particle size distribution of particle X
59: particle size distribution of particle Y
C$_1$: optical axis
$\theta$: scattering angle

What is claimed is:

1. A light scattering measurement device of a dispersion liquid including at least one type of particles, the light scattering measurement device comprising:

a light source unit that irradiates the dispersion liquid with measurement light;

a parameter setting unit that sets at least one of a scattering angle or a measurement wavelength as a measurement parameter;

a scattered light measurement unit that obtains a plurality of pieces of scattering intensity data by measuring a scattering intensity of scattered light emitted from the dispersion liquid by the measurement light a plurality of times while changing a value of the measurement parameter set by the parameter setting unit a plurality of times; and a calculation unit that calculates scattering intensity time variation characteristic data and scattering intensity parameter-dependent data from the plurality of pieces of scattering intensity data obtained by the scattered light measurement unit, fits the calculated scattering intensity time variation characteristic data and the calculated scattering intensity parameter-dependent data using a theoretical formula or a simulation based on a theory of electromagnetic wave behavior that defines a relationship of a refractive index, a particle diameter, and the scattering intensity, specifies a combination of the number of types of particles in the dispersion liquid, a refractive index of a particle, and a particle size distribution of the particle by the fitting based on an evaluation value, and specifies a material of each type of particle of the specified particles in the dispersion liquid, wherein the evaluation value is calculated based on the scattering intensity time variation characteristic data and the scattering intensity parameter-dependent data.

2. The light scattering measurement device according to claim 1,
    wherein the measurement parameter is the scattering angle, and the scattered light measurement unit obtains the plurality of pieces of scattering intensity data by measuring the scattering intensity of the scattered light of the dispersion liquid a plurality of times while changing a value of the scattering angle by two angles or more.

3. The light scattering measurement device according to claim 2,
    wherein the scattered light measurement unit measures a light intensity of a polarized component of the scattered light of the dispersion liquid obtained by irradiating the dispersion liquid with the measurement light having specific polarization, as the scattering intensity.

4. The light scattering measurement device according to claim 2,
    wherein the scattered light measurement unit measures at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times.

5. The light scattering measurement device according to claim 2,
    wherein a profile of the scattering intensity obtained while changing the value of the measurement parameter is different for each of a plurality of types of particles of the particles.

6. The light scattering measurement device according to claim 2,
    wherein the calculated scattering intensity time variation characteristic data of the measurement parameter is calculated based on a Stokes-Einstein's theoretical formula, and the scattering intensity parameter-dependent data of the measurement parameter is calculated based on at least one of a Mie scattering theoretical formula, a discrete dipole approximation method, or a finite-difference time-domain method.

7. The light scattering measurement device according to claim 1,
    wherein the measurement parameter is the measurement wavelength, and the scattered light measurement unit obtains the plurality of pieces of scattering intensity data by measuring the scattering intensity of the scattered light of the dispersion liquid a plurality of times using the measurement wavelength of two wavelengths or more.

8. The light scattering measurement device according to claim 1,
    wherein the scattered light measurement unit measures a light intensity of a polarized component of the scattered light of the dispersion liquid obtained by irradiating the dispersion liquid with the measurement light having specific polarization, as the scattering intensity.

9. The light scattering measurement device according to claim 1,
    wherein the scattered light measurement unit measures at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times.

10. The light scattering measurement device according to claim 1,
    wherein a profile of the scattering intensity obtained while changing the value of the measurement parameter is different for each of a plurality of types of particles of the particles.

11. The light scattering measurement device according to claim 1,
    wherein the calculated scattering intensity time variation characteristic data of the measurement parameter is calculated based on a Stokes-Einstein's theoretical formula, and the scattering intensity parameter-dependent data of the measurement parameter is calculated based on at least one of a Mie scattering theoretical formula, a discrete dipole approximation method, or a finite-difference time-domain method.

12. A light scattering measurement method of a dispersion liquid including at least one type of particles,
    wherein at least one of a scattering angle or a measurement wavelength is set as a measurement parameter, and
    the particle measurement method comprises:
    a measurement step of measuring a scattering intensity of scattered light emitted from the dispersion liquid by the measurement light a plurality of times while changing a value of the set measurement parameter a plurality of times;
    a calculation step of calculating scattering intensity time variation characteristic data and scattering intensity parameter-dependent data from a plurality of pieces of scattering intensity data obtained by the measurement step;
    a step of fitting the scattering intensity time variation characteristic data and the scattering intensity parameter-dependent data, which are obtained by the calculation step, using a theoretical formula or a simulation based on a theory of electromagnetic wave behavior that defines a relationship of a refractive index, a particle diameter, and the scattering intensity;
    a step of specifying a combination of the number of types of particles in the dispersion liquid, a refractive index of a particle, and a particle size distribution of the particle by the fitting based on an evaluation value, wherein the evaluation value is calculated based on the scattering intensity time variation characteristic data and the scattering intensity parameter-dependent data; and a step of specifying a material of each type of particle of the specified particles in the dispersion liquid.

13. The light scattering measurement method according to claim 12, wherein the measurement parameter is the scattering angle, and in the measurement step, the scattering intensity of the scattered light of the dispersion liquid is measured a plurality of times while changing a value of the scattering angle by two angles or more.

14. The light scattering measurement method according to claim 13, wherein, in the measurement step, a light intensity of a polarized component of the scattered light of the dispersion liquid obtained by irradiating the dispersion liquid with the measurement light having specific polarization is measured as the scattering intensity.

15. The light scattering measurement method according to claim 13, wherein, in the measurement step, at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times is measured.

16. The light scattering measurement method according to claim 12, wherein the measurement parameter is the measurement wavelength, and in the measurement step, the scattering intensity of the scattered light of the dispersion liquid is measured a plurality of times using the measurement wavelength of two wavelengths or more.

17. The light scattering measurement method according to claim 12, wherein, in the measurement step, a light intensity of a polarized component of the scattered light of the dispersion liquid obtained by irradiating the dispersion liquid with the measurement light having specific polarization is measured as the scattering intensity.

18. The light scattering measurement method according to claim 12, wherein, in the measurement step, at least one of scattering intensity parameter-dependent data obtained by successively irradiating the dispersion liquid with the measurement light having a plurality of polarization states or scattering intensity parameter-dependent data obtained by extracting a polarized component of the scattered light emitted from the dispersion liquid a plurality of times is measured.

19. The light scattering measurement method according to claim 12, wherein a profile of the scattering intensity obtained while changing the value of the measurement parameter is different for each of a plurality of types of particles of the particles.

20. The light scattering measurement method according to claim 12, wherein the calculated scattering intensity time variation characteristic data of the measurement parameter is calculated based on a Stokes-Einstein's theoretical formula, and the scattering intensity parameter-dependent data of the measurement parameter is calculated based on at least one of a Mie scattering theoretical formula, a discrete dipole approximation method, or a finite-difference time-domain method.

* * * * *